US008194063B2

(12) United States Patent
Levey et al.

(10) Patent No.: US 8,194,063 B2
(45) Date of Patent: Jun. 5, 2012

(54) ELECTROLUMINESCENT DISPLAY COMPENSATED DRIVE SIGNAL

(75) Inventors: Charles I. Levey, West Henrietta, NY (US); John W. Hamer, Rochester, NY (US)

(73) Assignee: Global OLED Technology LLC, Herndon, VA (US)

( * ) Notice: Subject to any disclaimer, the term of this patent is extended or adjusted under 35 U.S.C. 154(b) by 640 days.

(21) Appl. No.: 12/397,526

(22) Filed: Mar. 4, 2009

(65) Prior Publication Data

US 2010/0225634 A1 Sep. 9, 2010

(51) Int. Cl.
*G06F 3/038* (2006.01)

(52) U.S. Cl. ............... 345/211; 345/64; 345/68; 345/76

(58) Field of Classification Search .................... 345/76, 345/212, 64, 78, 83, 695, 211; 324/769
See application file for complete search history.

(56) References Cited

U.S. PATENT DOCUMENTS 4,896,947 A 1/1990 Leenhouts
5,034,340 A 7/1991 Tanaka et al.
6,081,073 A 6/2000 Salam
6,414,661 B1 7/2002 Shen et al.
6,473,065 B1 10/2002 Fan
6,489,631 B2 12/2002 Young et al.
6,518,962 B2 2/2003 Kimura et al.
6,897,842 B2 5/2005 Gu
6,989,636 B2 1/2006 Cok et al.
6,995,519 B2 2/2006 Arnold et al.
7,116,058 B2 10/2006 Lo et al.
7,199,602 B2 4/2007 Nara et al.
7,345,660 B2 3/2008 Mizukoshi et al.
8,004,479 B2 * 8/2011 White et al. .................... 345/76
2003/0057895 A1 3/2003 Kimura
2003/0122813 A1 7/2003 Ishizuki et al.
2005/0007392 A1 1/2005 Kasai et al.
2006/0170712 A1 * 8/2006 Miller et al. .................. 345/695
2006/0214888 A1 9/2006 Schneider et al.
2006/0273997 A1 12/2006 Nathan et al.
2008/0048951 A1 2/2008 Naugler, Jr. et al.
2008/0272993 A1 11/2008 Le Roy
2009/0135114 A1 * 5/2009 White et al. .................... 345/78
2009/0160740 A1 * 6/2009 Leon et al. ....................... 345/76
2009/0295422 A1 * 12/2009 Hamer et al. ................. 324/769

(Continued)

OTHER PUBLICATIONS

Kagan et al, Thin-film Transistors, New York: Marcel Dekker, 2003, Sec. 3.5, pp. 121-131.

(Continued)

*Primary Examiner* — Thuy Pardo
(74) *Attorney, Agent, or Firm* — Morgan, Lewis & Bockius LLP

(57) ABSTRACT

Subpixels on an electroluminescent (EL) display panel, such as an organic light-emitting diode (OLED) panel, are compensated for initial nonuniformity ("mura") and for aging effects such as threshold voltage $V_{th}$ shift, EL voltage $V_{oled}$ shift, and OLED efficiency loss. The drive current of each subpixel is measured at one or more measurement reference gate voltages to form status signals representing the characteristics of the drive transistor and EL emitter of those subpixels. Current measurements are taken in the linear region of drive transistor operation to improve signal-to-noise ratio in systems such as modern LTPS PMOS OLED displays, which have relatively small $V_{oled}$ shift over their lifetimes and thus relatively small current change due to channel-length modulation. Various sources of noise are also suppressed to further increase signal-to-noise ratio.

14 Claims, 19 Drawing Sheets

U.S. PATENT DOCUMENTS

2010/0013748 A1* 1/2010 Cok et al. ........................ 345/83

OTHER PUBLICATIONS

Shinar, ed. Organic Light-Emitting Devices, a survey, New York: Springer-Verlag 2004, Sec. 3.4, pp. 95-97.

Mohan et al, Stability issues in digital circuits in amorphous silicon technology, Electrical and Computer Engineering, 2001, vol. 1, pp. 583-588.

Lee et al, A New a-Si:H tFT Pixel Design Compensating Threshold Voltage Degradation of TFT and OLED, SID 2004 Digest, pp. 264-274.

Kuo, Thin Film Transistors: Materials and Processes, vol. 2: Polycrystalline Thin Film Transistors, Boston: Kluwer Academic Publishers 2004, p. 412.

* cited by examiner

ELECTROLUMINESCENT DISPLAY COMPENSATED DRIVE SIGNAL

CROSS REFERENCE TO RELATED APPLICATIONS

Reference is made to commonly-assigned, co-pending U.S. patent application Ser. No. 11/962,182 filed Dec. 21, 2007, entitled "Electroluminescent Display Compensated Analog Transistor Drive Signal" to Leon et al, U.S. patent application Ser. No. 12/274,559 filed Nov. 20, 2008, entitled "Electroluminescent Display Initial-Nonuniformity-Compensated Drive Signal" to Leon et al. and U.S. patent application Ser. No. 12/396,662 filed Mar. 3, 2009, entitled "Electroluminescent Subpixel Compensated Drive Signal" by Levey et al, the disclosures of which are incorporated herein.

FIELD OF THE INVENTION

The present invention relates to control of a signal applied to a drive transistor for supplying current through a plurality of electroluminescent emitters on an electroluminescent display.

BACKGROUND OF THE INVENTION

Flat-panel displays are of great interest as information displays for computing, entertainment, and communications. For example, electroluminescent (EL) emitters have been known for some years and have recently been used in commercial display devices. Such displays employ both active-matrix and passive-matrix control schemes and can employ a plurality of subpixels. Each subpixel contains an EL emitter and a drive transistor for driving current through the EL emitter. The subpixels are typically arranged in two-dimensional arrays with a row and a column address for each subpixel, and having a data value associated with the subpixel. Subpixels of different colors, such as red, green, blue, and white are grouped to form pixels. EL displays can be made using various emitter technologies, including coatable-inorganic light-emitting diode, quantum-dot, and organic light-emitting diode (OLED).

Electroluminescent (EL) flat-panel display technologies, such as organic light-emitting diode (OLED) technology, provide benefits in color gamut, luminance, and power consumption over other technologies such as liquid-crystal display (LCD) and plasma display panel (PDP). However, EL displays suffer from performance degradation over time. In order to provide a high-quality image over the life of the display, this degradation must be compensated for. Furthermore, OLED displays suffer from visible nonuniformities across a display. These nonuniformities can be attributed to both the EL emitters in the display and, for active-matrix displays, to variability in the thin-film transistors used to drive the EL emitters.

The light output of an EL emitter is roughly proportional to the current through the emitter, so the drive transistor in an EL subpixel is typically configured as a voltage-controlled current source responsive to a gate-to-source voltage $V_{gs}$. Source drivers similar to those used in LCD displays provide the control voltages to the drive transistors. Source drivers can convert a desired code value into an analog voltage to control a drive transistor. The relationship between code value and voltage is typically non-linear, although linear source drivers with higher bit depths are becoming available. Although the nonlinear code value-to-voltage relationship has a different shape for OLEDs than the characteristic LCD S-shape (shown in e.g. U.S. Pat. No. 4,896,947), the source driver electronics required are very similar between the two technologies. In addition to the similarity between LCD and EL source drivers, LCD displays and EL displays are typically manufactured on the same substrate: amorphous silicon (a-Si), as taught e.g. by Tanaka et al. in U.S. Pat. No. 5,034,340. Amorphous Si is inexpensive and easy to process into large displays.

Degradation Modes

Amorphous silicon, however, is metastable: over time, as voltage bias is applied to the gate of an a-Si TFT, its threshold voltage ($V_{th}$) shifts, thus shifting its I-V curve (Kagan & Andry, ed. *Thin-film Transistors*. New York: Marcel Dekker, 2003. Sec. 3.5, pp. 121-131). $V_{th}$ typically increases over time under forward bias, so over time, $V_{th}$ shift will, on average, cause a display to dim.

In addition to a-Si TFT instability, modern EL emitters have their own instabilities. For example, in OLED emitters, over time, as current passes through an OLED emitter, its forward voltage ($V_{oled}$) increases and its efficiency (typically measured in cd/A) decreases (Shinar, ed. *Organic Light-Emitting Devices: a survey*. New York: Springer-Verlag, 2004. Sec. 3.4, pp. 95-97). The loss of efficiency causes a display to dim on average over time, even when driven with a constant current. Additionally, in typical OLED display configurations, the OLED is attached to the source of the drive transistor. In this configuration, increases in $V_{oled}$ will increase the source voltage of the transistor, lowering $V_{gs}$ and thus, the current through the OLED emitter ($I_{oled}$), and therefore causing dimming over time.

These three effects ($V_{th}$ shift, OLED efficiency loss, and $V_{oled}$ rise) cause each individual OLED subpixel to lose luminance over time at a rate proportional to the current passing through that OLED subpixel. ($V_{th}$ shift is the primary effect, $V_{oled}$ shift the secondary effect, and OLED efficiency loss the tertiary effect.) Therefore, as the display dims over time, those subpixels that are driven with more current will fade faster. This differential aging causes objectionable visible burn-in on displays. Differential aging is an increasing problem today as, for example, more and more broadcasters continuously superimpose their logos over their content in a fixed location. Typically, a logo is brighter than content around it, so the pixels in the logo age faster than the surrounding content, making a negative copy of the logo visible when watching content not containing the logo. Since logos typically contain high-spatial-frequency content (e.g. the AT&T globe), one subpixel can be heavily aged while an adjacent subpixel is only lightly aged. Therefore, each subpixel must be independently compensated for aging to eliminate objectionable visible burn-in.

Moreover, some transistor technologies, such as low-temperature polysilicon (LTPS), can produce drive transistors that have varying mobilities and threshold voltages across the surface of a display (Kuo, Yue, ed. Thin Film Transistors: Materials and Processes, vol. 2: Polycrystalline Thin Film Transistors. Boston: Kluwer Academic Publishers, 2004. pg. 412). This produces objectionable nonuniformity. Further, nonuniform OLED material deposition can produce emitters with varying efficiencies, also causing objectionable nonuniformity. These nonuniformities are present at the time the panel is sold to an end user, and so are termed initial nonuniformities, or "mura." FIG. 11A shows an example histogram of subpixel luminance exhibiting differences in characteristics between subpixels. All subpixels were driven at the same level, so should have had the same luminance. As FIG. 11A shows, the resulting luminances varied by 20 percent in either direction. This results in unacceptable display performance.

Prior Art

It has been known to compensate for one or more of the three aging effects. Similarly, it is known in the prior art to measure the performance of each pixel in a display and then to correct for the performance of the pixel to provide a more uniform output across the display.

Considering $V_{th}$ shift, the primary effect and one which is reversible with applied bias (Mohan et al., "Stability issues in digital circuits in amorphous silicon technology," Electrical and Computer Engineering, 2001, Vol. 1, pp. 583-588), compensation schemes are generally divided into four groups: in-pixel compensation, in-pixel measurement, in-panel measurement, and reverse bias.

In-pixel $V_{th}$ compensation schemes add additional circuitry to each subpixel to compensate for the $V_{th}$ shift as it happens. For example, Lee et al., in "A New a-Si:H TFT Pixel Design Compensating Threshold Voltage Degradation of TFT and OLED", SID 2004 Digest, pp. 264-274, teach a seven-transistor, one-capacitor (7T1C) subpixel circuit which compensates for $V_{th}$ shift by storing the $V_{th}$ of each subpixel on that subpixel's storage capacitor before applying the desired data voltage. Methods such as this compensate for $V_{th}$ shift, but they cannot compensate for $V_{oled}$ rise or OLED efficiency loss. These methods require increased subpixel complexity and increased subpixel electronics size compared to the conventional 2T1C voltage-drive subpixel circuit. Increased subpixel complexity reduces yield, because the finer features required are more vulnerable to fabrication errors. Particularly in typical bottom-emitting configurations, increased total size of the subpixel electronics increases power consumption because it reduces the aperture ratio, the percentage of each subpixel which emits light. Light emission of an OLED is proportional to area at a fixed current, so an OLED emitter with a smaller aperture ratio requires more current to produce the same luminance as an OLED with a larger aperture ratio. Additionally, higher currents in smaller areas increase current density in the OLED emitter, which accelerates $V_{oled}$ rise and OLED efficiency loss.

In-pixel measurement $V_{th}$ compensation schemes add additional circuitry to each subpixel to permit values representative of $V_{th}$ shift to be measured. Off-panel circuitry then processes the measurements and adjusts the drive of each subpixel to compensate for $V_{th}$ shift. For example, Nathan et al., in U.S. Patent Application Publication No. 2006/0273997, teach a four-transistor pixel circuit which permits TFT degradation data to be measured as either current under given voltage conditions or voltage under given current conditions. Nara et al., in U.S. Pat. No. 7,199,602, teach adding an inspection interconnect to a display, and adding a switching transistor to each pixel of the display to connect it to the inspection interconnect. Kimura et al., in U.S. Pat. No. 6,518,962, teach adding correction TFTs to each pixel of a display to compensate for EL degradation. These methods share the disadvantages of in-pixel $V_{th}$ compensation schemes, but some can additionally compensate for $V_{oled}$ shift or OLED efficiency loss.

In-pixel measurement $V_{th}$ compensation schemes add circuitry around a panel to take and process measurements without modifying the design of the panel. For example, Naugler et al., in U.S. Patent Application Publication No. 2008/0048951, teach measuring the current through an OLED emitter at various gate voltages of a drive transistor to locate a point on precalculated lookup tables used for compensation. However, this method requires a large number of lookup tables, consuming a significant amount of memory. Further, this method does not recognize the problem of integrating compensation with image processing typically performed in display drive electronics. It also does not recognize the limitations of typical display drive hardware, and so requires a timing scheme which is difficult to implement without expensive custom circuitry.

Reverse-bias $V_{th}$ compensation schemes use some form of reverse voltage bias to shift $V_{th}$ back to some starting point. These methods cannot compensate for $V_{oled}$ rise or OLED efficiency loss. For example, Lo et al., in U.S. Pat. No. 7,116,058, teach modulating the reference voltage of the storage capacitor in an active-matrix pixel circuit to reverse-bias the drive transistor between each frame. Applying reverse-bias within or between frames prevents visible artifacts, but reduces duty cycle and thus peak brightness. Reverse-bias methods can compensate for the average $V_{th}$ shift of the panel with less increase in power consumption than in-pixel compensation methods, but they require more complicated external power supplies, can require additional pixel circuitry or signal lines, and may not compensate individual subpixels that are more heavily faded than others.

Considering $V_{oled}$ shift and OLED efficiency loss, U.S. Pat. No. 6,995,519 by Arnold et al. is one example of a method that compensates for aging of an OLED emitter. This method assumes that the entire change in emitter luminance is caused by changes in the OLED emitter. However, when the drive transistors in the circuit are formed from a-Si, this assumption is not valid, as the threshold voltage of the transistors also changes with use. The method of Arnold will thus not provide complete compensation for subpixel aging in circuits wherein transistors show aging effects. Additionally, when methods such as reverse bias are used to mitigate a-Si transistor threshold voltage shifts, compensation of OLED efficiency loss can become unreliable without appropriate tracking/prediction of reverse bias effects, or a direct measurement of the OLED voltage change or transistor threshold voltage change.

Alternative methods for compensation measure the light output of each subpixel directly, as taught e.g. by Young et al. in U.S. Pat. No. 6,489,631. Such methods can compensate for changes in all three aging factors, but require either a very high-precision external light sensor, or integrated light sensors in each subpixel. An external light sensor adds to the cost and complexity of a device, while integrated light sensors increase subpixel complexity and electronics size, with attendant performance reductions.

Regarding initial-nonuniformity compensation, U.S. Patent Application Publication No. 2003/0122813 by Ishizuki et al. discloses a display panel driving device and driving method for providing high-quality images without irregular luminance. The light-emission drive current flowing is measured while each pixel successively and independently emits light. Then the luminance is corrected for each input pixel data based on the measured drive current values. According to another aspect, the drive voltage is adjusted such that one drive current value becomes equal to a predetermined reference current. In a further aspect, the current is measured while an off-set current, corresponding to a leak current of the display panel, is added to the current output from the drive voltage generator circuit, and the resultant current is supplied to each of the pixel portions. The measurement techniques are iterative, and therefore slow. Further, this technique is directed at compensation for aging, not for initial nonuniformity.

U.S. Pat. No. 6,081,073 by Salam describes a display matrix with a process and control means for reducing brightness variations in the pixels. This patent describes the use of a linear scaling method for each pixel based on a ratio between the brightness of the weakest pixel in the display and the brightness of each pixel. However, this approach will lead to an overall reduction in the dynamic range and brightness of the display and a reduction and variation in the bit depth at which the pixels can be operated.

U.S. Pat. No. 6,473,065 by Fan describes methods of improving the display uniformity of an OLED. In this method, the display characteristics of all organic-light-emitting-elements are measured, and calibration parameters for each organic-light-emitting-element are obtained from the measured display characteristics of the corresponding organic-light-emitting-element. The calibration parameters of each organic-light-emitting-element are stored in a calibration memory. The technique uses a combination of look-up tables and calculation circuitry to implement uniformity correction. However, the described approaches require either a lookup table providing a complete characterization for each pixel, or extensive computational circuitry within a device controller. This is likely to be expensive and impractical in most applications.

U.S. Pat. No. 7,345,660 by Mizukoshi et al. describes an EL display having stored correction offsets and gains for each subpixel, and having a measurement circuit for measuring the current of each subpixel. While this apparatus can correct for initial nonuniformity, it uses a sense resistor to measure current, and thus has limited signal-to-noise performance. Furthermore, the measurements required by this method can be very time-consuming for large panels.

U.S. Pat. No. 6,414,661 by Shen et al. describes a method and associated system that compensates for long-term variations in the light-emitting efficiency of individual organic light emitting diodes in an OLED display device by calculating and predicting the decay in light output efficiency of each pixel based on the accumulated drive current applied to the pixel and derives a correction coefficient that is applied to the next drive current for each pixel. This patent describes the use of a camera to acquire images of a plurality of equal-sized sub-areas. Such a process is time-consuming and requires mechanical fixtures to acquire the plurality of sub-area images.

U.S. Patent Application Publication No. 2005/0007392 by Kasai et al. describes an electro-optical device that stabilizes display quality by performing correction processing corresponding to a plurality of disturbance factors. A grayscale characteristic generating unit generates conversion data having grayscale characteristics obtained by changing the grayscale characteristics of display data that defines the grayscales of pixels with reference to a conversion table whose description contents include correction factors. However, their method requires a large number of LUTs, not all of which are in use at any given time, to perform processing, and does not describe a method for populating those LUTs.

U.S. Pat. No. 6,989,636 by Cok et al. describes using a global and a local correction factor to compensate for nonuniformity. However, this method assumes a linear input and is consequently difficult to integrate with image-processing paths having nonlinear outputs.

U.S. Pat. No. 6,897,842 by Gu describes using a pulse width modulation (PWM) mechanism to controllably drive a display (e.g., a plurality of display elements forming an array of display elements). A non- uniform pulse interval clock is generated from a uniform pulse interval clock, and then used to modulate the width, and optionally the amplitude, of a drive signal to controllably drive one or more display elements of an array of display elements. A gamma correction is provided jointly with a compensation for initial nonuniformity. However, this technique is only applicable to passive-matrix displays, not to the higher-performance active-matrix displays which are commonly employed.

Existing mura and $V_{th}$ compensation schemes are not without drawbacks, and few of them compensate for $V_{oled}$ rise or OLED efficiency loss. Those that compensate each subpixel for $V_{th}$ shift do so at the cost of panel complexity and lower yield. There is a continuing need, therefore, for improving compensation to overcome these objections to compensate for EL panel degradation and prevent objectionable visible burn-in over the entire lifetime of an EL display panel, including at the start of its life.

SUMMARY OF THE INVENTION

In accordance with the present invention, there is provided, in apparatus for providing drive transistor control signals to the gate electrodes of drive transistors in a plurality of EL subpixels in an EL panel, including a first voltage supply, a second voltage supply, and a plurality of EL subpixels in the EL panel; each EL subpixel including a drive transistor for applying current to an EL emitter in each EL subpixel, each drive transistor having a first supply electrode electrically connected to the first voltage supply and a second supply electrode electrically connected to a first electrode of the EL emitter; and each EL emitter including a second electrode electrically connected to the second voltage supply, the improvement comprising:

(a) a sequence controller for selecting one or more of the plurality of EL subpixels;

(b) a test voltage source electrically connected to the gate electrodes of the drive transistors of the one or more selected EL subpixels;

(c) a voltage controller for controlling voltages of the first voltage supply, second voltage supply and test voltage source to operate the drive transistors of the one or more selected EL subpixels in a linear region;

(d) a measuring circuit for measuring the current passing through the first and second voltage supplies to provide respective status signals for each of the one or more selected EL subpixels representing the characteristics of the drive transistor and EL emitter of those subpixels, wherein the current is measured while the drive transistors of the one or more selected EL subpixels are operated in the linear region;

(e) means for providing a linear code value for each subpixel;

(f) a compensator for changing the linear code values in response to the status signals to compensate for variations in the characteristics of the drive transistor and EL emitter in each subpixel; and (g) a source driver for producing the drive transistor control signals in response to the changed linear code values for driving the gate electrodes of the drive transistors.

The present invention provides an effective way of providing the drive transistor control signal. It requires only one measurement of each subpixel to perform compensation. It can be applied to any active-matrix backplane. The compensation of the control signal has been simplified by using a look-up table (LUT) to change signals from nonlinear to linear so compensation can be in linear voltage domain. It compensates for $V_{th}$ shift, $V_{oled}$ shift, and OLED efficiency loss without requiring complex pixel circuitry or external measurement devices. It does not decrease the aperture ratio of a subpixel. It has no effect on the normal operation of the panel. It can raise yield of good panels by making objectionable initial nonuniformity invisible. Improved S/N (signal/noise) is obtained by taking measurements of the characteristics of the EL subpixel while operating in the linear region of transistor operation.

DETAILED DESCRIPTION OF THE INVENTION

The present invention compensates for mura (initial non-uniformity) and degradation in the drive transistors and electroluminescent (EL) emitters of a plurality of subpixels on an active-matrix EL display panel, such as an organic light-emitting diode (OLED) panel. In one embodiment, it compensates for $V_{th}$ shift, $V_{oled}$ shift, and OLED efficiency loss of all subpixels on an active-matrix OLED panel. A panel includes a plurality of pixels, each of which includes one or more subpixels. For example, each pixel might include a red, a green, and a blue subpixel. Each subpixel includes an EL emitter, which emits light, and surrounding electronics. A subpixel is the smallest addressable element of a panel.

The discussion to follow first considers the system as a whole. It then proceeds to the electrical details of a subpixel, followed by the electrical details for measuring one subpixel and the timing for measuring multiple subpixels. It next covers how the compensator uses measurements. Finally, it describes how this system is implemented in one embodiment, e.g. in a consumer product, from the factory to end-of-life.

Overview

Figure 1:
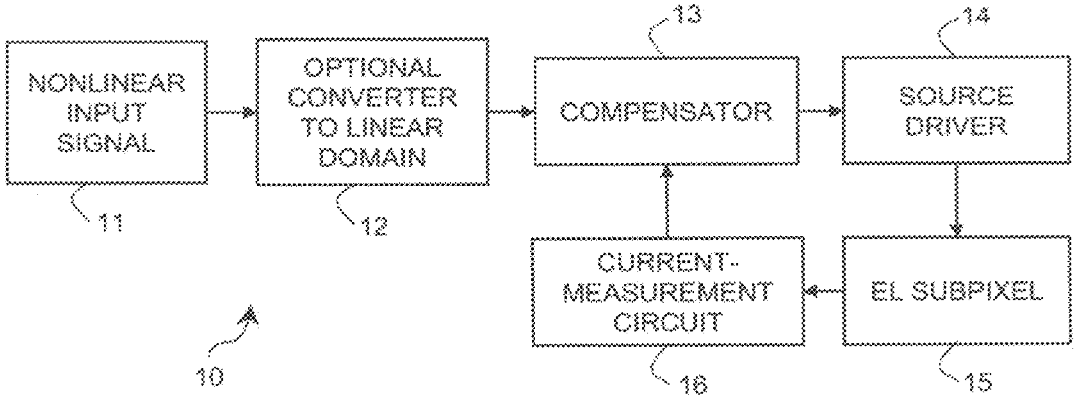
FIG. 1 is a block diagram of a display system according to an embodiment of the present invention.

FIG. 1 shows a block diagram of a display system 10 of the present invention. For clarity, only one EL subpixel is shown, but the present invention is effective for compensation of a plurality of subpixels. A nonlinear input signal 11 commands a particular light intensity from an EL emitter in an EL subpixel, which can be one of many on an EL panel. This signal 11 can come from a video decoder, an image processing path, or another signal source, can be digital or analog, and can be nonlinearly-or linearly-coded. For example, the nonlinear input signal can be an sRGB code value (IEC 61966-2-1: 1999+A1) or an NTSC luma voltage. Whatever the source and format, the signal can preferentially be converted into a digital form and into a linear domain, such as linear voltage, by a domain-conversion unit 12, which will be discussed further in "Cross-domain processing, and bit depth," below. The result of the conversion will be a linear code value, which can represent a commanded drive voltage.

A compensator 13 receives the linear code value, which can correspond to the particular light intensity commanded from the EL subpixel. As a result of variations in the drive transistor and EL emitter caused by mura and by operation of the drive transistor and EL emitter in the EL subpixel over time, the EL subpixel will generally not produce the commanded light intensity in response to the linear code value. The compensator 13 outputs a changed linear code value that will cause the EL subpixel to produce the commanded intensity, thereby compensating for variations in the characteristics of the drive transistor and EL emitter caused by operation of the drive transistor and EL emitter over time, and for variations in the characteristics of the drive transistor and EL emitter from subpixel to subpixel. The operation of the compensator will be discussed further in "Implementation," below.

The changed linear code value from the compensator 13 is passed to a source driver 14 which can be a digital-to-analog converter. The source driver 14 produces a drive transistor control signal, which can be an analog voltage or current, or a digital signal such as a pulse-width-modulated waveform, in response to the changed linear code value. In a preferred embodiment, the source driver 14 can be a source driver having a linear input-output relationship, or a conventional LCD or OLED source driver with its gamma voltages set to produce an approximately linear output. In the latter case, any deviations from linearity will affect the quality of the results. The source driver 14 can also be a time-division (digital-drive) source driver, as taught e.g. in commonly assigned WO 2005/116971 by Kawabe. The analog voltage from a digital-drive source driver is set at a predetermined level commanding light output for an amount of time dependent on the output signal from the compensator. A conventional source driver, by contrast, provides an analog voltage at a level dependent on the output signal from the compensator for a fixed amount of time (generally the entire frame). A source driver can output one or more drive transistor control signals simultaneously. A panel preferably has a plurality of source drivers, each outputting the drive transistor control signal for one subpixel at a time.

The drive transistor control signal produced by the source driver 14 is provided to an EL subpixel 15. This circuit, as will be discussed in "Display element description," below. When the analog voltage is provided to the gate electrode of the drive transistor in the EL subpixel 15, current flows through the drive transistor and EL emitter, causing the EL emitter to emit light. There is generally a linear relationship between current through the EL emitter and luminance of the light output of the emitter, and a nonlinear relationship between voltage applied to the drive transistor and current through the EL emitter. The total amount of light emitted by an EL emitter during a frame can thus be a nonlinear function of the voltage from the source driver 14.

The current flowing through the EL subpixel is measured under specific drive conditions by a current-measurement circuit 16, as will be discussed further in "Data collection," below. The measured current for the EL subpixel provides the compensator with the information it needs to adjust the commanded drive signal. This will be discussed further in "Algorithm," below.

Display Element Description

Figure 10:
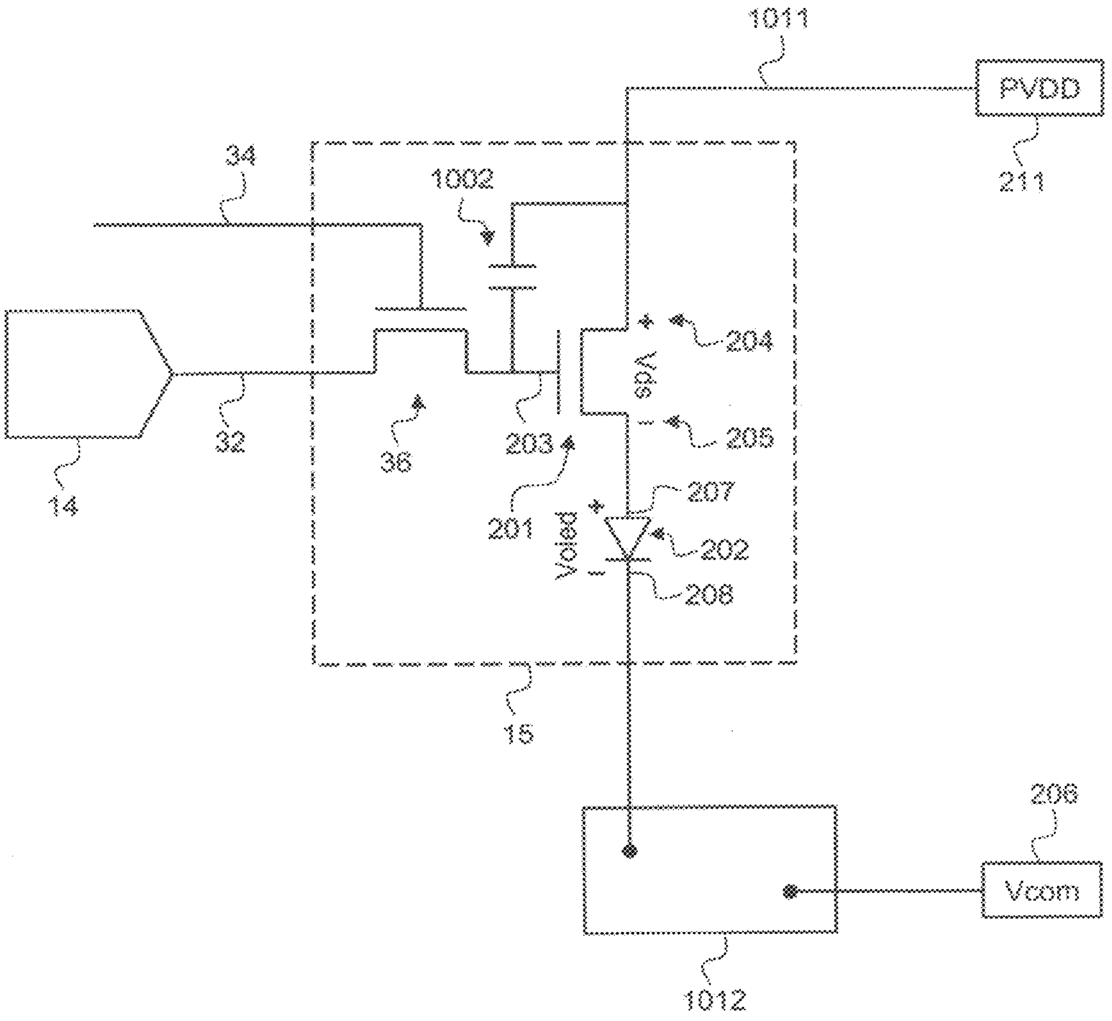
FIG. 10 is a detailed schematic of a subpixel.

FIG. 10 shows an EL subpixel 15 that applies current to an EL emitter, such as an OLED emitter, and associated circuitry. EL subpixel 15 includes a drive transistor 201, an EL emitter 202, and optionally a storage capacitor 1002 and a select transistor 36. A first voltage supply 211 ("PVDD") can be positive, and a second voltage supply 206 ("Vcom") can be negative. The EL emitter 202 has a first electrode 207 and a second electrode 208. The drive transistor has a gate electrode 203, a first supply electrode 204 which can be the drain of the drive transistor, and a second supply electrode 205 which can be the source of the drive transistor. A drive transistor control signal can be provided to the gate electrode 203, optionally through a select transistor 36. The drive transistor control signal can be stored in storage capacitor 1002. The first supply electrode 204 is electrically connected to the first voltage supply 211. The second supply electrode 205 is electrically connected to the first electrode 207 of the EL emitter 202 to apply current to the EL emitter. The second electrode 208 of the EL emitter is electrically connected to the second voltage supply 206. The voltage supplies are typically located off the EL panel. Electrical connection can be made through switches, bus lines, conducting transistors, or other devices or structures capable of providing a path for current.

First supply electrode 204 is electrically connected to first voltage supply 211 through PVDD bus line 1011, second electrode 208 is electrically connected to second voltage supply 206 through a sheet cathode 1012, and the drive transistor control signal is provided to gate electrode 203 by a source driver 14 across a column line e.g. 32*a* when select transistor 36 is activated by a gate line 34.

Figure 2:
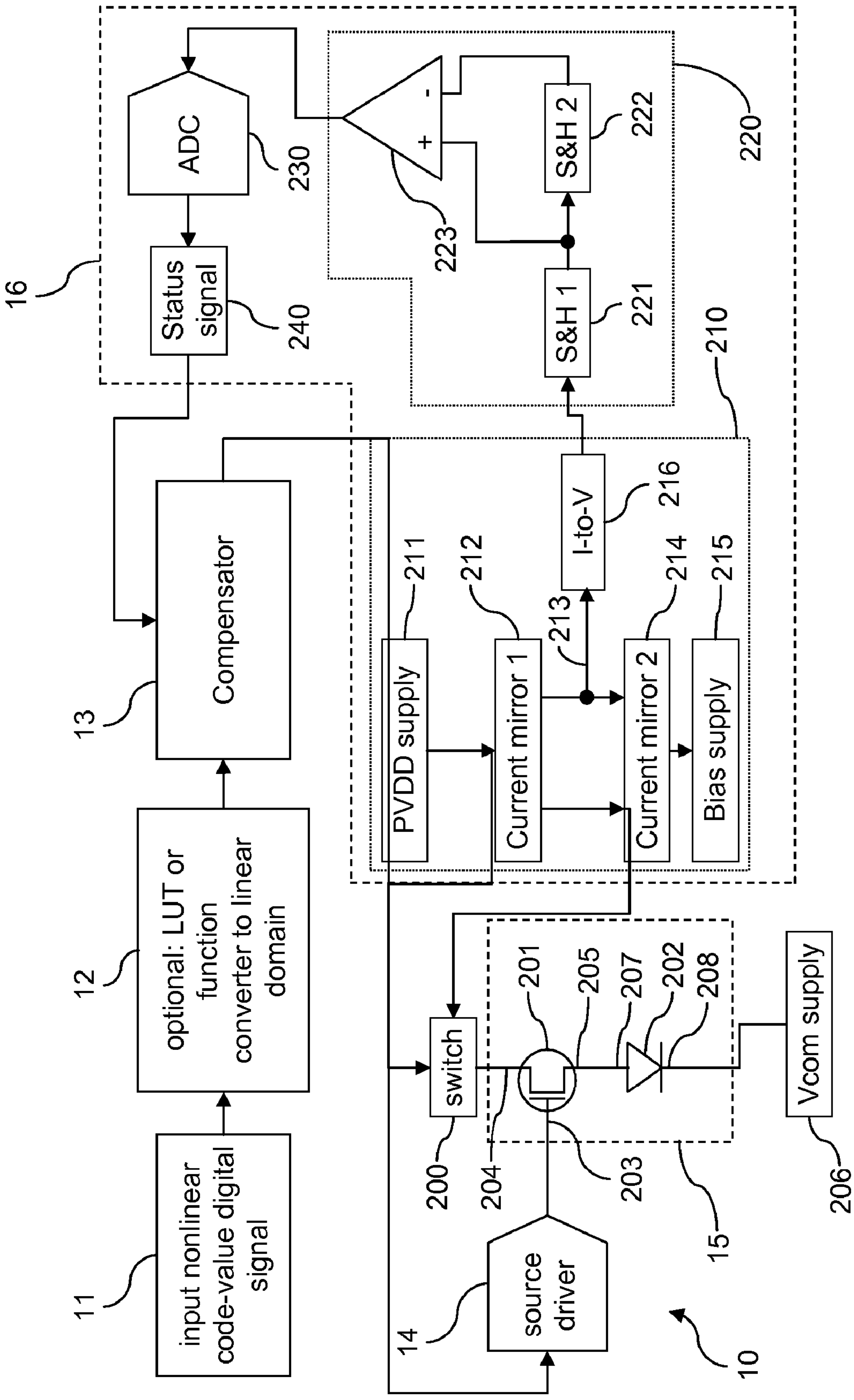
FIG. 2 is a schematic of a detailed version of the block diagram of FIG. 1.

FIG. 2 shows the EL subpixel 15 in the context of the display system 10, including nonlinear input signal 11, converter 12, compensator 13, and source driver 14 as shown in FIG. 1. For clarity, only one EL subpixel 15 is shown, but the present invention is effective for a plurality of subpixels. A plurality of subpixels can be processed serially or in parallel as will be described further. As described above, the drive transistor 201 has gate electrode 203, first supply electrode 204 and second supply electrode 205. The EL emitter 202 has first electrode 207 and second electrode 208. The system has voltage supplies 211 and 206.

Neglecting leakage, the same current, the drive current, passes from first voltage supply 211, through the first supply electrode 204 and the second supply electrode 205, through the EL emitter electrodes 207 and 208, to the second voltage supply 206. The drive current is what causes the EL emitter to emit light. Therefore, current can be measured at any point in this drive current path. Current can be measured off the EL panel at the first voltage supply 211 to reduce the complexity of the EL subpixel. Drive current is referred to herein as $I_{ds}$, the current through the drain and source terminals of the drive transistor.

Data Collection

Hardware

Still referring to FIG. 2, to measure the current of each of a plurality of EL subpixels 15 without relying on any special electronics on the panel, the present invention employs a measuring circuit 16 including a current mirror unit 210, a correlated double-sampling (CDS) unit 220, and optionally an analog-to-digital converter (ADC) 230 and a status signal generation unit 240.

Each EL subpixel 15 is measured at a current corresponding to a measurement reference gate voltage (FIG. 5A 510) on the gate electrode 203 of drive transistor 201. To produce this voltage, when taking measurements, source driver 14 acts as a test voltage source and provides the measurement reference gate voltage to gate electrode 203. Measurements can be advantageously kept invisible to the user by selecting a measurement reference gate voltage which corresponds to a measured current which is less than a selected threshold current. The selected threshold current can be chosen to be less than that required to emit appreciable light from an EL emitter, e.g. 1.0 nit or less. Since measured current is not known until the measurement is taken, the measurement reference gate voltage can be selected by modeling to correspond to an expected current which is a selected headroom percentage below the selected threshold current.

The current mirror unit 210 is attached to voltage supply 211, although it can be attached anywhere in the drive current path. A first current mirror 212 supplies drive current to the EL subpixel 15 through a switch 200, and produces a mirrored current on its output 213. The mirrored current can be equal to the drive current, or a function of the drive current. For example, the mirrored current can be a multiple of the drive current to provide additional measurement-system gain. A second current mirror 214 and a bias supply 215 apply a bias current to the first current mirror 212 to reduce the impedance of the first current mirror viewed from the panel, advantageously increasing the response speed of the measurement circuit. This circuit also reduces changes in the current through the EL subpixels being measured due to voltage changes in the current mirror resulting from current draw of the measurement circuit. This advantageously improves signal-to-noise ratio over other current-measurement options, such as a simple sense resistor, which can change voltages at the drive transistor terminals depending on current. Finally, a current-to-voltage (I-to-V) converter 216 converts the mirrored current from the first current mirror into a voltage signal for further processing. The I-to-V converter 216 can include a transimpedance amplifier or a low-pass filter.

Switch 200, which can be a relay or FET, can selectively electrically connect the measuring circuit to the drive current flow through the first and second electrodes of the drive transistor 201. During measurement, the switch 200 can electrically connect first voltage supply 211 to first current mirror 212 to permit measurements. During normal operation, the switch 200 can electrically connect first voltage supply 211 directly to first supply electrode 204 rather than to first current mirror 212, thus removing the measuring circuit from the drive current flow. This causes the measurement circuitry to have no effect on normal operation of the panel. It also advantageously permits the measurement circuit's components, such as the transistors in the current mirrors 212 and 214, to be sized only for measurement currents and not for operational currents. As normal operation generally draws much more current than measurement, this permits substantial reduction in the size and cost of the measurement circuit.

Sampling

The current mirror unit 210 permits measurement of the current for one EL subpixel at a time. To measure the current for multiple subpixels, in one embodiment the present invention uses correlated double-sampling, with a timing scheme usable with standard OLED source drivers.

Figure 3:
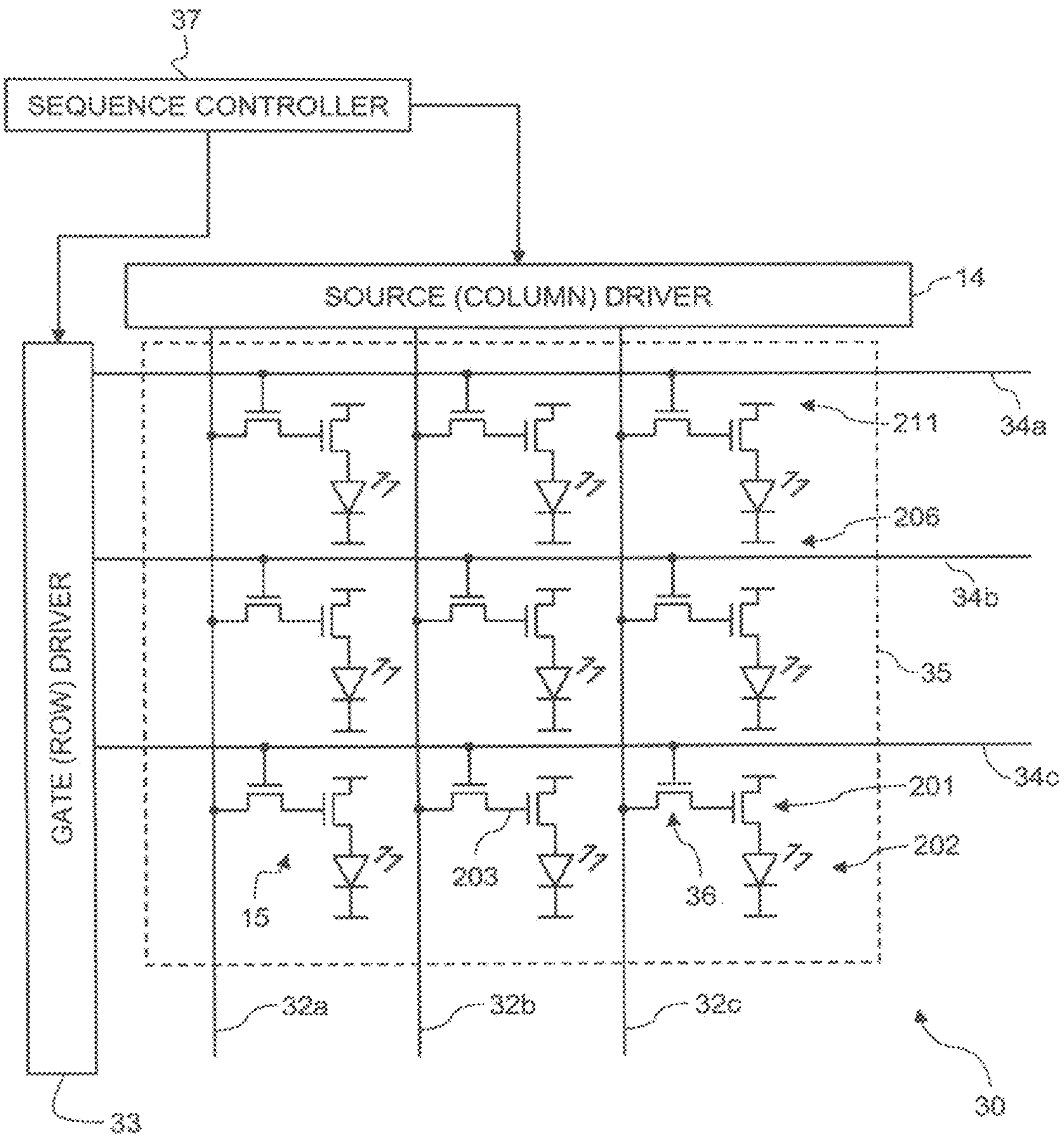
FIG. 3 is a diagram of a typical EL panel.

Referring to FIG. 3, an EL panel 30 useful in the present invention includes a source driver 14 driving column lines 32*a*, 32*b*, 32*c*, a gate driver 33 driving row lines 34*a*, 34*b*, 34*c*, and a subpixel matrix 35. The subpixel matrix 35 includes a plurality of EL subpixels 15 in an array of rows and columns. Note that the terms "row" and "column" do not imply any particular orientation of the EL panel. EL subpixel 15 includes EL emitter 202, drive transistor 201, and select transistor 36 as shown in FIG. 10. The gate of select transistor 36 is electrically connected to the respective row line 34*a*, 32*b* or 34*c*, and of its source and drain electrodes, one is electrically connected to the respective column line 32*a*, 32*b* or 32*c*, and one is connected to the gate electrode 203 of the drive transistor 201. Whether the source electrode of select transistor 36 is connected to the column line (e.g. 32*a*) or the drive transistor gate electrode 203 does not affect the operation of the select transistor. For clarity, the voltage supplies 211 and 206 shown in FIG. 10 are indicated in FIG. 3 where they connect to each subpixel, as the present invention can be employed with a variety of schemes for connecting the supplies with the subpixels.

In a standard timing sequence used in typical operation of this panel, the source driver 14 drives appropriate drive transistor control signals on the respective column lines 32*a*, 32*b*, 32*c*. The gate driver 33 then activates the first row line 34*a*, causing the appropriate control signals to pass through the select transistors 36 to the gate electrodes 203 of the appropriate drive transistors 201 to cause those transistors to apply current to their attached EL emitters 202. The gate driver 33 then deactivates the first row line 34*a*, preventing control signals for other rows from corrupting the values passed through the select transistors 36. The source driver 14 drives control signals for the next row on the column lines 32*a*, 32*b*, 32*c*, and the gate driver 33 activates the next row 34*b*. This process repeats for all rows. In this way all EL subpixels 15 on the panel receive appropriate control signals, one row at a time. The row time is the time between activating one row line (e.g. 34*a*) and activating the next (e.g. 34*b*). This time is generally constant for all rows. A sequence controller 37 controls the source driver and gate driver appropriately to produce the standard timing sequence and provide appropriate data to each subpixel. The sequence controller also selects one or more of the plurality of EL subpixels 15 for measurement. The functions of the sequence controller and compensator can be provided in a single microprocessor or integrated circuit, or in separate devices.

According to the present invention, the sequence controller uses the standard timing sequence advantageously to select only one subpixel at a time, working down a column. Referring to FIG. 3, suppose only column 32*a* is driven, starting with all subpixels off. Column line 32*a* will have a drive transistor control signal, such as a high voltage, causing subpixels attached thereto to emit light; all other column lines 32*b*-32*c* will have a control signal, such as a low voltage, causing subpixels attached thereto not to emit light. Since all subpixels are off, the panel is drawing a dark current, which can be zero or only a leakage amount (see "Sources of noise", below). As rows are activated, the subpixels attached to column 32*a* turn on, and so the total current drawn by the panel rises.

Figure 4A:
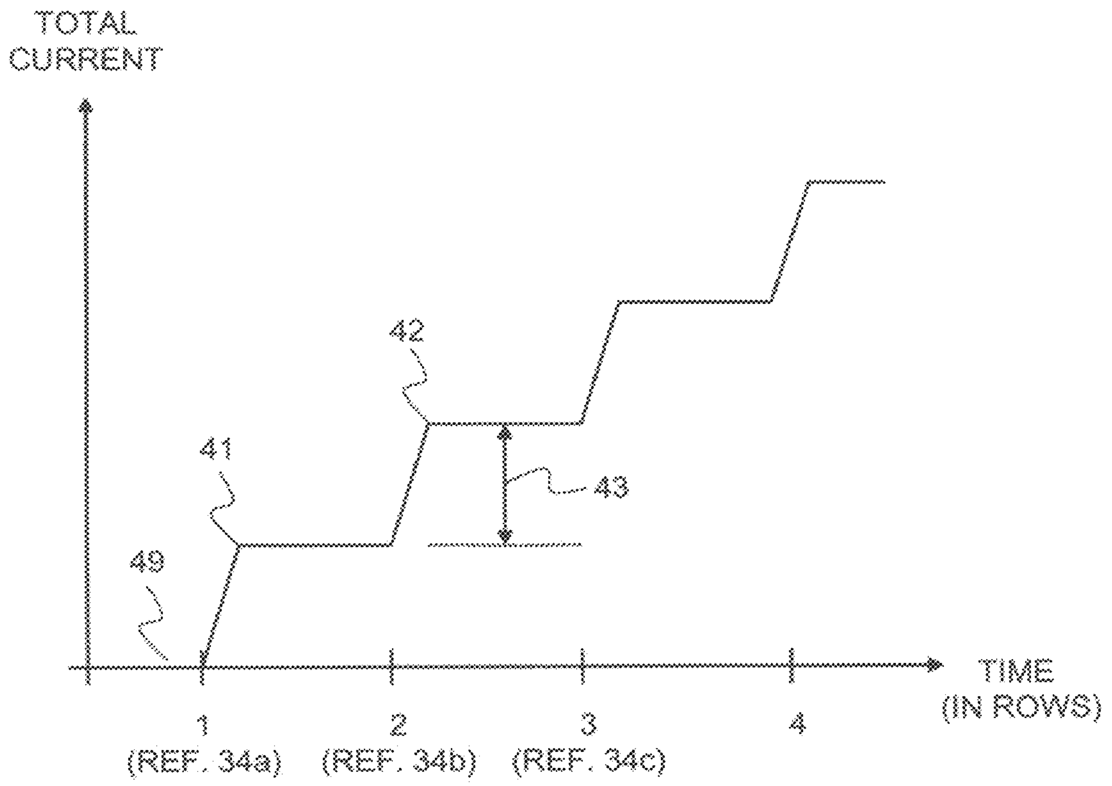
FIG. 4A is a timing diagram for operating the measurement circuit of FIG. 2 under ideal conditions.

Referring now to FIG. 4A, and also to FIGS. 2 and 3, dark current 49 is measured. At time 1, a subpixel is activated (e.g. with row line 34*a*) and its current 41 measured with measuring circuit 16. Specifically, what is measured is the voltage signal from the current-mirror unit 210, which represents the drive current $I_{ds}$ through the first and second voltage supplies as discussed above; measuring the voltage signal representing current is referred to as "measuring current" for clarity. Current 41 is the sum of the current from the first subpixel and the dark current. At time 2, the next subpixel is activated (e.g. with row line 34*b*) and current 42 is measured. Current 42 is the sum of the current from the first subpixel, the current from the second subpixel, and the dark current. A difference 43 between the second-measured current 42 and the first-measured current 41 is the current drawn by the second subpixel. In this way the process proceeds down the first column, measuring the current of each subpixel. The second column is then measured, then the third, and likewise one column at a time for the rest of the panel. Note that each current (e.g. 41, 42) is measured as soon after activating a subpixel as possible. In an ideal situation, each measurement can be taken any time before activating the next subpixel, but as will be discussed below, taking measurements immediately after activating a subpixel can help remove error due to self-heating effects. This method permits measurements to be taken as fast as the settling time of a subpixel will permit.

Referring back to FIG. 2, and also to FIG. 4, correlated double-sampling unit 220 responds to the voltage signals from the I-to-V converter 216 to provide measured data for each subpixel. In hardware, currents are measured by latching their corresponding voltage signals from current mirror unit 210 into sample-and-hold units 221 and 222 of FIG. 2. A differential amplifier 223 takes the differences between successive subpixel measurements. The output of sample-and-hold unit 221 is electrically connected to the positive terminal of differential amplifier 223 and the output of unit 222 is electrically connected to the negative terminal of amplifier 223. For example, when current 41 is measured, the measurement is latched into sample-and-hold unit 221. Then, before current 42 is measured (latched into unit 221), the output of unit 221 is latched into second sample-and-hold unit 222. Current 42 is then measured. This leaves current 41 in unit 222 and current 42 in unit 221. The output of the differential amplifier, the value in unit 221 minus the value in unit 222, is thus (the voltage signal representing) current 42 minus (the voltage signal representing) current 41, or difference 43. In this way, stepping down the rows and across the columns, measurements can be taken of each subpixel. Measurements can successively be taken at a variety of drive levels (gate voltages or current densities) to form I-V curves for each of the measured subpixels. After a column is measured, it can be deactivated before the next column is measured, e.g. by writing data corresponding to a black level.

In an embodiment of the present invention, the sequence controller 37 can select one row of subpixels at a time, and the respective currents can be measured for each of the plurality of subpixels in the row using multiple measurement circuits, or a multiplexer connecting a single measurement circuit in turn to the drive current path through each subpixel. In another embodiment, the sequence controller can divide the subpixels on the panel into groups, and select different groups at different times. Each group can include e.g. only a subset of the subpixels in each column. This permits measurements to be taken more quickly, at the expense of not updating every subpixel's respective measurement each time a measurement is taken. In either embodiment, while measurements are taken, the test voltage source can provide drive transistor control signals only to the selected subpixels. The test voltage source can also provide to the selected subpixels drive transistor control signals causing significant drive current to flow, and to all subpixels not selected drive transistor control signals causing no current, or only dark current, to flow.

The analog or digital output of differential amplifier 223 can be provided directly to compensator 13. Alternatively, analog-to-digital converter 230 can preferably digitize the output of differential amplifier 223 to provide digital measurement data to compensator 13.

The measuring circuit 16 can preferably include a status signal generation unit 240 which receives the respective outputs of differential amplifier 223 and performs further processing to provide the respective status signals for each EL subpixel. Status signals can be digital or analog. Referring to FIG. 6B, status signal generation unit 240 is shown in the context of compensator 13 for clarity. In various embodiments, status signal generation unit 240 can include a memory 619. Memory 619 is addressed by the location 601 of a selected subpixel or an analogous value, for example a serial number in measurement order, thereby providing respective stored data for each subpixel.

In a first embodiment of the present invention, each current difference, e.g. 43, can be the status signal for a corresponding subpixel. For example, current difference 43 can be the status signal for the subpixel attached to row line 34*b* and column line 32*a*. In this embodiment the status signal generation unit 240 can perform a linear transform on current differences, or pass them through unmodified. All subpixels can be measured at the same measurement reference gate voltage, so that the current (43) through each subpixel at the measurement reference gate voltage meaningfully represents the characteristics of the drive transistor and EL emitter in that subpixel. The current differences 43 can be stored in memory 619.

In a second embodiment, memory 619 stores a respective target signal $i_0$ 611 for each EL subpixel. Memory 619 also stores a most recent current measurement $i_1$ 612 of each EL subpixel, which can be the value most recently measured by the measurement circuit for the corresponding subpixel. Measurement 612 can also be an average of a number of measurements, an exponentially-weighted moving average of measurements over time, or the result of other smoothing methods which will be obvious to those skilled in the art. Target signal $i_0$ 611 and current measurement $i_1$ 612 can be compared as described below to provide a percent current 613, which can be the status signal for the EL subpixel. The target signal for a subpixel can be a current measurement of that subpixel taken at a different time than measurement $i_1$ 612, preferably before $i_1$, and thus percent current can represent variations in the characteristics of the respective drive transistor and EL emitter caused by operation of the respective drive transistor and EL emitter over time. The target signal for a subpixel can also be a selected reference signal so that percent current represents the characteristics of the drive transistor and EL emitter in the respective EL subpixel at a particular time, and specifically with respect to the target.

In a third embodiment, memory 619 stores a mura-compensation gain term $m_g$ 615, and a mura-compensation offset term $m_o$ 616, calculated as described below. The status signal for each EL subpixel can include a respective gain and offset, and specifically respective $m_g$ and $m_o$ values. Values $m_g$ and $m_o$ are computed with respect to a target and thus represent variations in the characteristics of the respective drive transistors and EL emitters across multiple subpixels. Additionally, any ($m_g$, $m_o$) pair by itself represents the characteristics of the drive transistor and EL emitter in the respective subpixel.

These three embodiments can be used together. For example, the status signal for each subpixel can include percent current, $m_g$ and $m_o$. Compensation, described below in "Implementation," can be performed in the same way whether the status signal indicates variations for a single subpixel over time (aging) or variations across multiple subpixels at a particular time (mura). Memory 619 can include RAM, nonvolatile RAM, such as a Flash memory, and ROM, such as EEPROM. In one embodiment, the $i_0$, $m_g$ and $m_o$ values are stored in EEPROM and the $i_1$ values are stored in Flash.

Sources of Noise

In practice, the current waveform can be other than a clean step, so measurements can be taken only after waiting for the waveform to settle. Multiple measurements of each subpixel can also be taken and averaged together. Such measurements can be taken consecutively before advancing to the next subpixel. Such measurements can also be taken in separate measurement passes, in which each subpixel on the panel is measured in each pass. Capacitance between voltage supplies 206 and 211 can add to the settling time. This capacitance can be intrinsic to the panel or provided by external capacitors, as is common in normal operation. It can be advantageous to provide a switch that can be used to electrically disconnect the external capacitors while taking measurements.

Noise on any voltage supply will affect the current measurement. For example, noise on the voltage supply which the gate driver uses to deactivate rows (often called VGL or Voff, and typically around −8 VDC) can capacitively couple across the select transistor into the drive transistor and affect the current, thus making current measurements noisier. If a panel has multiple power-supply regions, for example a split supply plane, those regions can be measured in parallel. Such measurement can isolate noise between regions and reduce measurement time.

Whenever the source driver switches, its noise transients can couple into the voltage supply planes and the individual subpixels, causing measurement noise. To reduce this noise, the control signals out of the source driver can be held constant while stepping down a column. For example, when measuring a column of red subpixels on an RGB stripe panel, the red code value supplied to the source driver for that column can be constant for the entire column. This will eliminate source-driver transient noise.

Source driver transients can be unavoidable at the beginning and ends of columns, as the source driver has to change from activating the present column (e.g. 32*a*) to activating the next column (e.g. 32*b*). Consequently, measurements for the first and last one or more subpixels in any column can be subject to noise due to transients. In one embodiment, the EL panel can have extra rows, not visible to the user, above and below the visible rows. There can be enough extra rows that the source driver transients occur only in those extra rows, so measurements of visible subpixels do not suffer. In another embodiment, a delay can be inserted between the source driver transient at the beginning of a column and the measurement of the first row in that column, and between the measurement of the last row in that column and the source driver transient at the end of a column.

Referring to FIG. 10, in an embodiment of the present invention, to reduce the magnitude of dark current 49 (FIG. 4A) and capacitive loading, a plurality of second voltage supplies 206 can be provided, and a sheet cathode 1012 can be divided into multiple regions, each connected to one of the plurality of second voltage supplies. In this embodiment, the panel is subdivided into regions, each having a corresponding second voltage supply. In each region, the second electrode 208 of each EL emitter 202 is electrically connected to only the corresponding second voltage supply 206. This embodiment can advantageously reduce dark current proportionally to the number of second power supplies without adding significant cost to the display system. In this embodiment, a separate measurement circuit 16 can be provided for each region of the panel, or a single measurement circuit 16 can be used for each region of the panel in turn.

Current Stability

This discussion so far assumes that once a subpixel is turned on and settles to some current, it remains at that current for the remainder of the column. Two effects that can violate that assumption are storage-capacitor leaking and within-subpixel effects.

Referring to FIG. 10, leakage current of select transistor 36 in EL subpixel 15 can gradually bleed off charge on storage capacitor 1002, changing the gate voltage of drive transistor 201 and thus the current drawn. Additionally, if column line 32 is changing value over time, it has an AC component, and therefore can couple through the parasitic capacitances of the select transistor onto the storage capacitor, changing the storage capacitor's value and thus the current drawn by the subpixel.

Even when the storage capacitor's value is stable, within-subpixel effects can corrupt measurements. A common within-subpixel effect is self-heating of the subpixel, which can change the current drawn by the subpixel over time. The drift mobility of an a-Si TFT is a function of temperature; increasing temperature increases mobility (Kagan & Andry, op. cit., sec. 2.2.2, pp. 42-43). As current flows through the drive transistor, power dissipation in the drive transistor and in the EL emitter will heat the subpixel, increasing the temperature of the transistor and thus its mobility. Additionally, heat lowers $V_{oled}$; in cases where the OLED is attached to the source terminal of the drive transistor, this can increase $V_{gs}$ of the drive transistor. These effects increase the amount of current flowing through the transistor. Under normal operation, self-heating can be a minor effect, as the panel can stabilize to an average temperature based on the average contents of the image it is displaying. However, when measuring subpixel currents, self-heating can corrupt measurements.

Figure 4B:
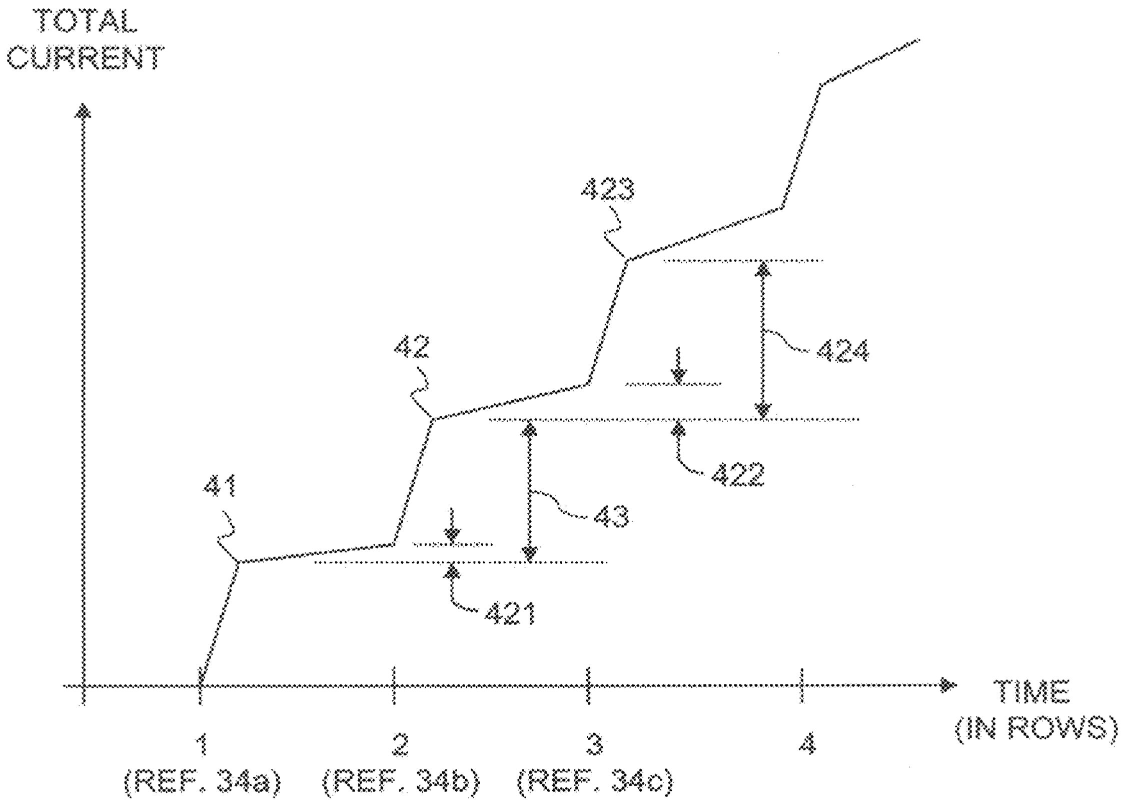
FIG. 4B is a timing diagram for operating the measurement circuit of FIG. 2 including error due to self-heating of subpixels.

Referring to FIG. 4B, current 41 is measured as soon as possible after activating subpixel 1. This way self-heating of subpixel 1 does not affect its measurement. However, in the time between the measurement of current 41 and the measurement of current 42, subpixel 1 will self-heat, increasing current by self-heating amount 421. Therefore, the computed difference 43 representing the current of subpixel 2 will be in error; it will be too large by self-heating amount 421. Self-heating amount 421 is the rise in current per subpixel per row time.

To correct for self-heating effects and any other within-subpixel effects producing similar noise signatures, the self-heating can be characterized and subtracted off the known self-heating component of each subpixel. Each subpixel generally increases current by the same amount during each row time, so with each succeeding subpixel the self-heating for all active subpixels can be subtracted off. For example, to calculate subpixel 3's current 424, measurement 423 can be reduced by self-heating amount 422, which is twice self-heating amount 421: amount 421 per subpixel, times two subpixels already active. The self-heating can be characterized by turning on one subpixel for tens or hundreds of row times and measuring its current periodically while it is on. The average slope of the current with respect to time can be multiplied by one row time to calculate the rise per subpixel per row time, i.e. self-heating amount 421.

Error due to self-heating, and power dissipation, can be reduced by selecting a lower measurement reference gate voltage (FIG. 5A 510), but a higher voltage improves signal-to-noise ratio. Measurement reference gate voltage can be selected for each panel design to balance these factors.

Algorithm

Figure 5A:
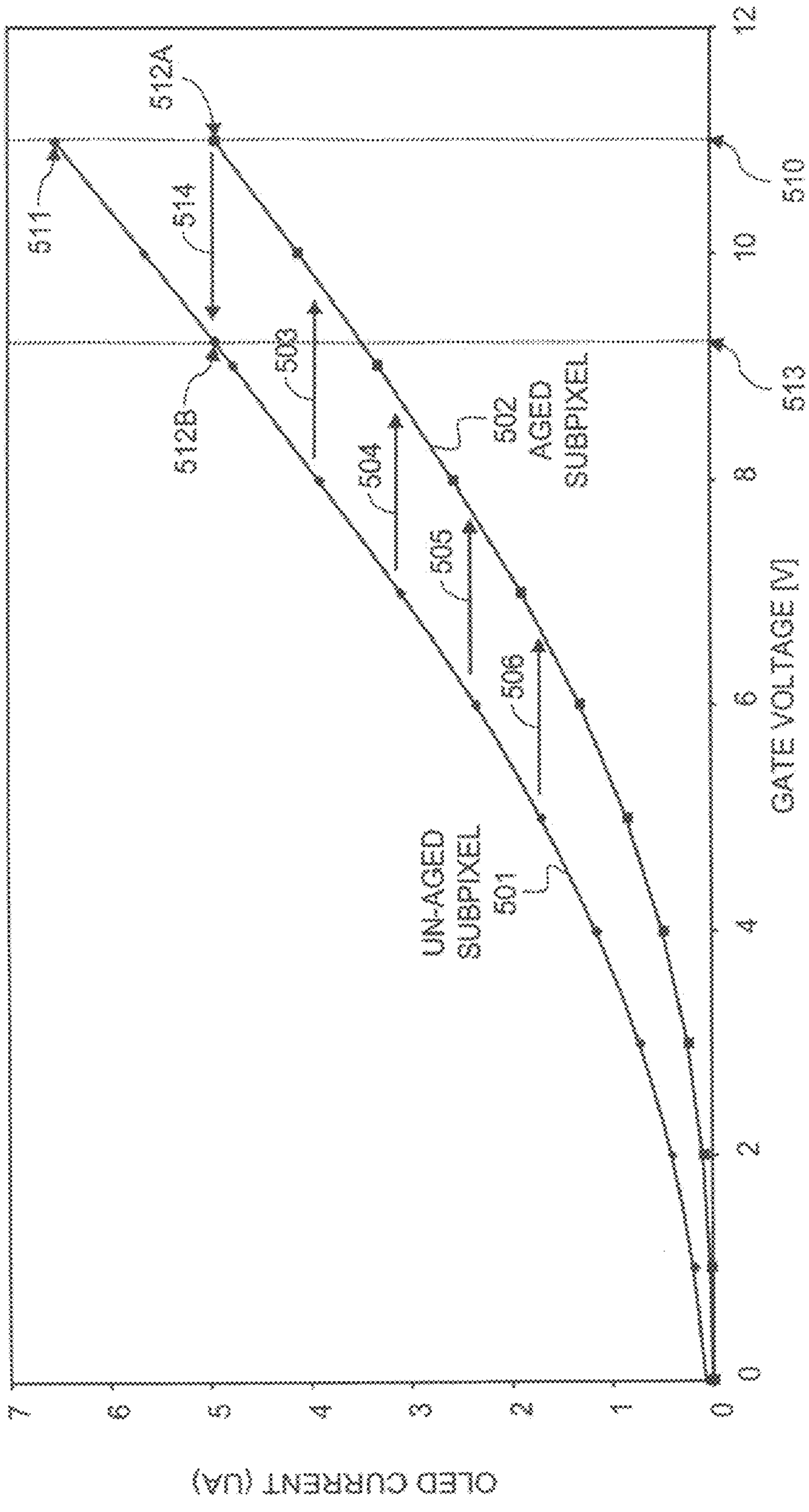
FIG. 5A is a representative I-V characteristic curve of un-aged and aged subpixels, showing $V_{th}$ shift.

Referring to FIG. 5A, I-V curve 501 is a measured characteristic of a subpixel before aging. I-V curve 502 is a measured characteristic of that subpixel after aging. Curves 501 and 502 are separated by what is largely a horizontal shift, as shown by identical voltage differences 503, 504, 505, and 506 at different current levels. That is, the primary effect of aging is to shift the I-V curve on the gate voltage axis by a constant amount. This is in keeping with the MOSFET saturation-region drive transistor equation, $I_d=K(V_{gs}-V_{th})^2$ (Lurch, N. *Fundamentals of electronics,* 2e. New York: John Wiley & Sons, 1971, pg. 110): the drive transistor is operated, $V_{th}$ increases; and as $V_{th}$ increases, $V_{gs}$ increases correspondingly to maintain $I_d$ constant. Therefore, constant $V_{gs}$ leads to lower $I_{ds}$ as $V_{th}$ increases.

At the measurement reference gate voltage 510, the unaged subpixel produced the current represented at point 511. The aged sub-pixel, however, produces at that gate voltage the lower amount of current represented at point 512*a*. Points 511 and 512*a* can be two measurements of the same subpixel taken at different times. For example, point 511 can be a measurement at manufacturing time, and point 512*a* can be a measurement after some use by a customer. The current represented at point 512*a* would have been produced by the un-aged subpixel when driven with voltage 513 (point 512*b*), so a voltage shift $\Delta V_{th}$ 514 is calculated as the voltage difference between voltages 510 and 513. Voltage shift 514 is thus the shift required to bring the aged curve back to the un-aged curve. In this example, $\Delta V_{th}$ 514 is just under two volts. Then, to compensate for the $V_{th}$ shift, and drive the aged subpixel to the same current as the un-aged subpixel had, voltage shift 514 is added to every commanded drive voltage (linear code value). For further processing, percent current is also calculated as current 512*a* divided by current 511. An unaged subpixel will thus have 100% current. Percent current is used in several algorithms according to the present invention. Any negative current reading 511, such as might be caused by extreme environmental noise, can be clipped to 0, or disregarded. Note that percent current is always calculated at the measurement reference gate voltage 510.

In general, the current of an aged subpixel can be higher or lower than that of an un-aged subpixel. For example, higher temperatures cause more current to flow, so a lightly-aged subpixel in a hot environment can draw more current than an unaged subpixel in a cold environment. The compensation algorithm of the present invention can handle either case; $\Delta V_{th}$ 514 can be positive or negative (or zero, for unaged pixels). Similarly, percent current can be greater or less than 100% (or exactly 100%, for unaged pixels).

Since the voltage difference due to $V_{th}$ shift is the same at all currents, any single point on the I-V curve can be measured to determine that difference. In one embodiment, measurements are taken at high gate voltages, advantageously increasing signal-to-noise ratio of the measurements, but any gate voltage on the curve can be used.

$V_{oled}$ shift is the secondary aging effect. As the EL emitter is operated, $V_{oled}$ shifts, causing the aged I-V curve to no longer be a simple shift of the un-aged curve. This is because $V_{oled}$ rises nonlinearly with current, so $V_{oled}$ shift will affect high currents differently than low currents. This effect causes the I-V curve to stretch horizontally as well as shifting. To compensate for $V_{oled}$ shift, two measurements at different drive levels can be taken to determine how much the curve has stretched, or the typical $V_{oled}$ shift of OLEDs under load can be characterized to permit estimation of $V_{oled}$ contribution in an open-loop manner. Both can produce acceptable results.

Figure 5B:
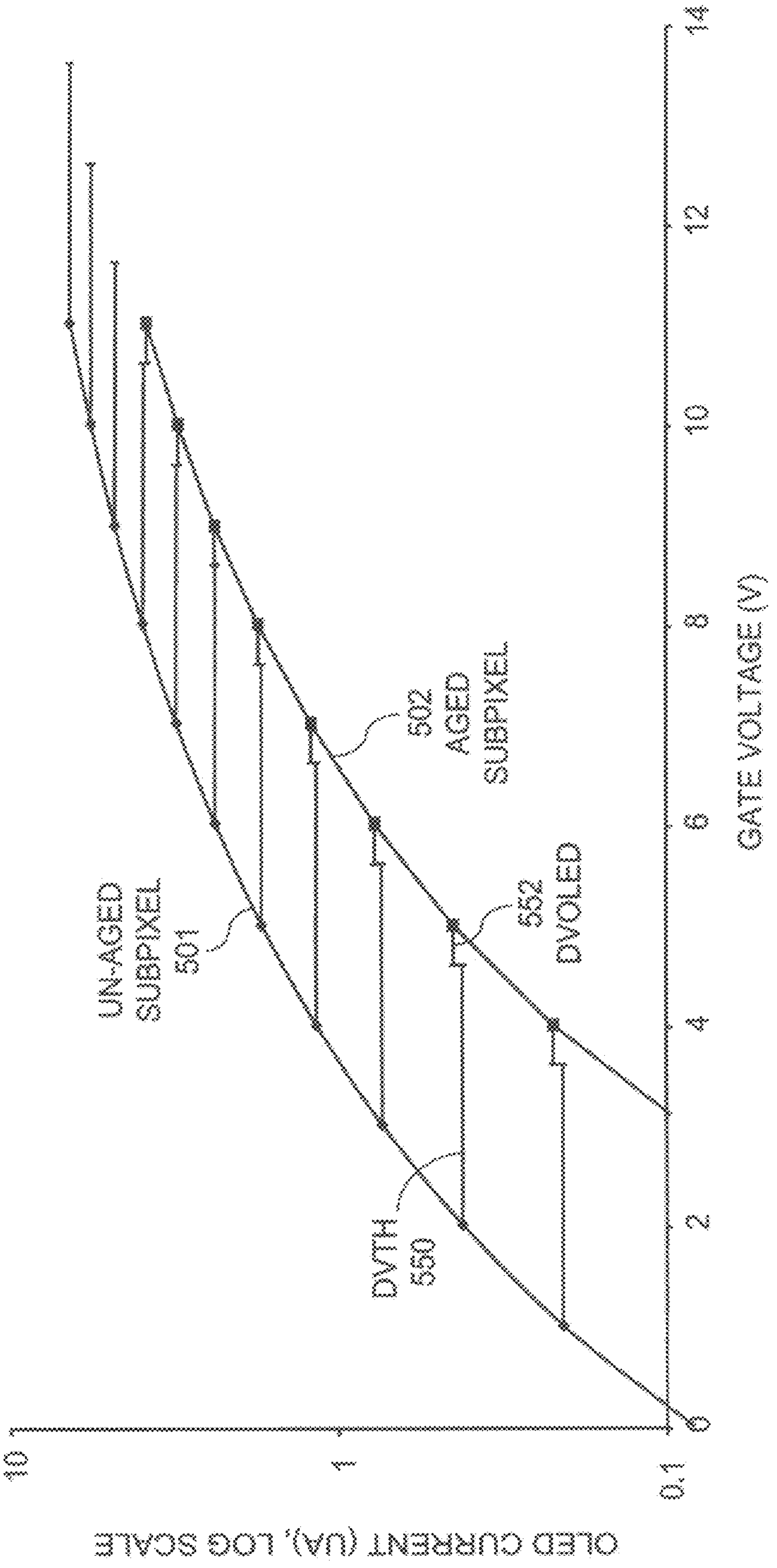
FIG. 5B is a representative I-V characteristic curve of un-aged and aged subpixels, showing $V_{th}$ and $V_{oled}$ shift.

Referring to FIG. 5B, an unaged-subpixel I-V curve 501 and an aged-subpixel I-V curve 502 are shown on a semilog scale. Components 550 are due to $V_{th}$ shift and components 552 are due to $V_{oled}$ shift. $V_{oled}$ shift can be characterized by driving an instrumented OLED subpixel with a typical input signal for a long period of time, and periodically measuring $V_{th}$ and $V_{oled}$. The two measurements can be made separately by providing a probe point on the instrumented subpixel between the OLED and the transistor. Using this characterization, percent current can be mapped to an appropriate $\Delta V_{th}$ and $\Delta V_{oled}$, rather than to a $V_{th}$ shift alone.

In one embodiment, the EL emitter 202 (FIG. 10) is connected to the source terminal of the drive transistor 201. Any change in $V_{oled}$ thus has a direct effect on $I_{ds}$, as it changes the voltage $V_s$ at the source terminal of the drive transistor and thus $V_{gs}$ of the drive transistor.

In a preferred embodiment, the EL emitter 202 is connected to the drain terminal of the drive transistor 201, for example, in PMOS non-inverted configurations, in which the OLED anode is tied to the drive transistor drain. $V_{oled}$ rise changes thus $V_{ds}$ of the drive transistor 201, as the OLED is connected in series with the drain-source path of the drive transistor. Modern OLED emitters, however, have much smaller $\Delta V_{oled}$ than older emitters for a given amount of aging, reducing the magnitude of $V_{ds}$ change and thus of $I_{ds}$ change.

Figure 11A:
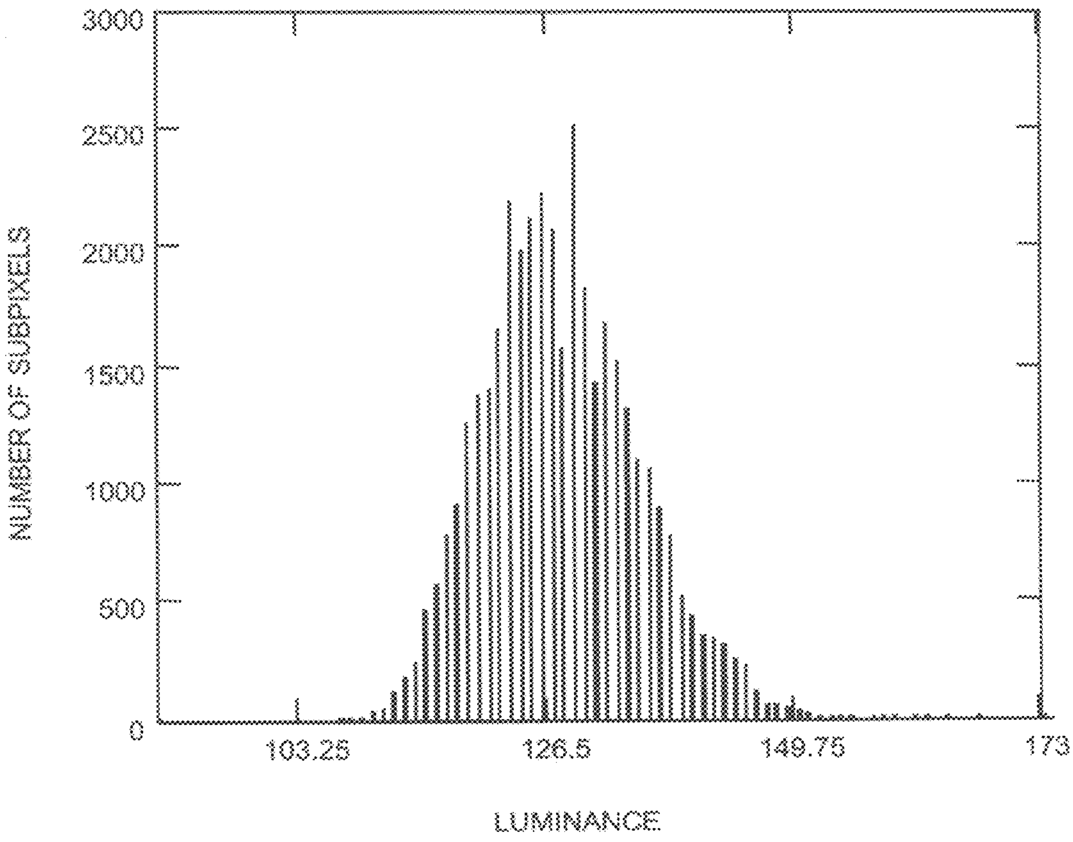
FIG. 11A is a histogram of luminances of subpixels exhibiting differences in characteristics.
Figure 11B:
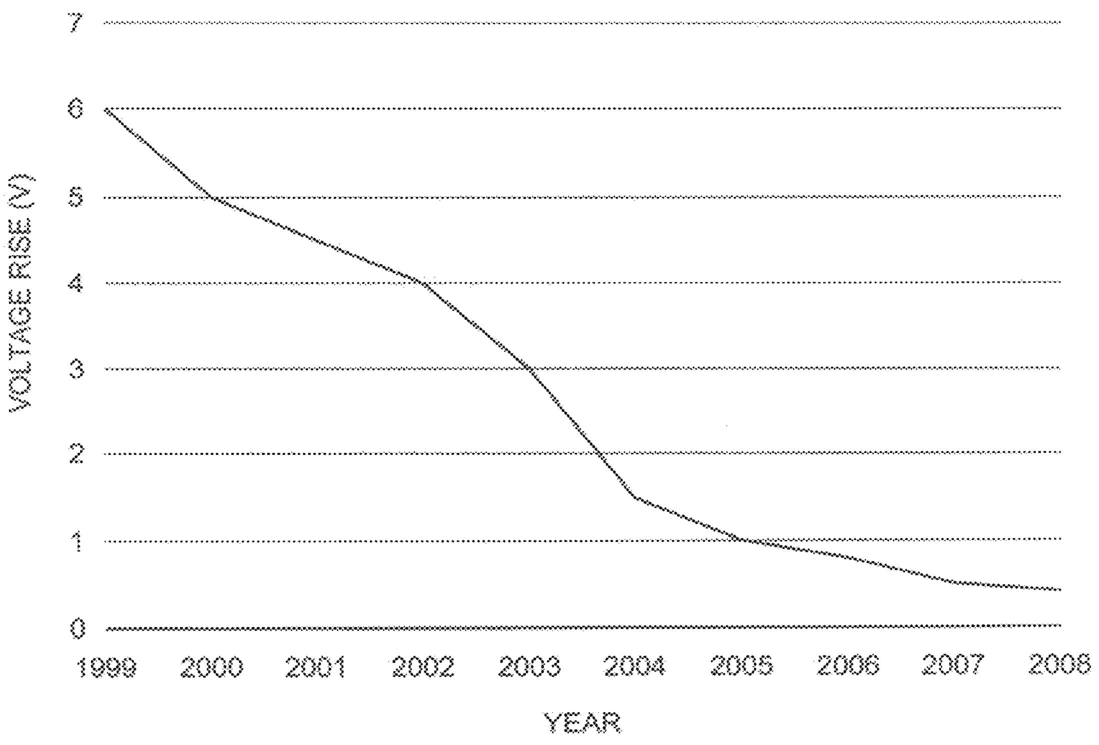
FIG. 11B is a plot of improvements in OLED voltage over time.

FIG. 11B shows a plot of the typical voltage rise $\Delta V_{oled}$ for a white OLED over its lifetime (until T50, 50% luminance, measured at 20 mA/cm$^2$). This plot shows the reduction in $\Delta V_{oled}$ as OLED technology has improved. This reduced $\Delta V_{oled}$ reduces $V_{ds}$ change. Referring to FIG. 5A, current 512*a* for an aged subpixel will be much closer to current 511 for a modern OLED emitter with a smaller $\Delta V_{oled}$ than it will for an older emitter with a larger $\Delta V_{oled}$. Therefore, much more sensitive current measurements can be required for modern OLED emitters than for older emitters. However, more sensitive measurement hardware can be expensive.

The requirement for extra measurement sensitivity can be mitigated by operating the drive transistor in the linear region of operation while taking current measurements. As is known in the electronics art, thin-film transistors conduct appreciable current in two different modes of operation: linear ($V_{ds}<V_{gs}-V_{th}$) and saturation ($V_{ds}>=V_{gs}-V_{th}$) (Lurch, op. cit., p. 111). In EL applications, the drive transistors are typically operated in the saturation region to reduce the effect of $V_{ds}$ variation on current. However, in the linear region of operation, where $$I_{ds}=K[2(V_{gs}-V_{th})V_{ds}-V_{ds}^2]$$

(Lurch, op. cit., pg. 112), the current $I_{ds}$ depends strongly on $V_{ds}$. Since $$V_{ds}=(PVDD-V_{com})-V_{oled}$$

as shown in FIG. 10, $I_{ds}$ in the linear region depends strongly on $V_{oled}$. Therefore, taking current measurements in the linear region of operation of drive transistor 201 advantageously increases the magnitude of change in measured current between a new OLED emitter (511) and an aged OLED emitter (512*a*) compared to taking the same measurement in the saturation region.

In one embodiment of the present invention, therefore, the sequence controller 37 can include a voltage controller. While measuring currents as described above, the voltage controller can control voltages for the first voltage supply 211 and second voltage supply 206, and the drive transistor control signal from source driver 14 operating as a test voltage source, to operate drive transistor 201 in the linear region. For example, in a PMOS non-inverted configuration, the voltage controller can hold the PVDD voltage and the drive transistor control signal at constant values and increase the Vcom voltage to reduce $V_{ds}$ without reducing $V_{gs}$. When $V_{ds}$ falls below $V_{gs}-V_{th}$, the drive transistor will be operating in the linear region and a measurement can be taken.

The voltage controller can also be provided separately from the sequence controller as long as the two are coordinated to operate the transistors in the linear region during measurements. In an embodiment described above, in which the sequence controller selects different groups of EL subpixels at different times, the voltage controller can control the voltages for the PVDD supply 211 and Vcom supply 206, and the respective drive transistor control signals from source driver 14, to operate the drive transistor 201 in each selected EL subpixel in the linear region. A panel can have multiple PVDD and Vcom supplies, in which case each supply can be controlled independently according to which EL subpixels are selected to operate the drive transistor 201 in each selected EL subpixel in the linear region.

OLED efficiency loss is the tertiary aging effect. As an OLED ages, its efficiency decreases, and the same amount of current no longer produces the same amount of light. To compensate for this without requiring optical sensors or additional electronics, OLED efficiency loss as a function of $V_{th}$ shift can be characterized, permitting estimation of the amount of extra current required to return the light output to its previous level. OLED efficiency loss can be characterized by driving an instrumented OLED subpixel with a typical input signal for a long period of time, and periodically measuring $V_{th}$, $V_{oled}$ and $I_{ds}$ at various drive levels. Efficiency can be calculated as $I_{ds}/V_{oled}$, and that calculation can be correlated to $V_{th}$ or percent current. Note that this characterization achieves most effective results when $V_{th}$ shift is always forward, since $V_{th}$ shift can be reversed more simply than OLED efficiency loss. If $V_{th}$ shift is reversed, correlating OLED efficiency loss with $V_{th}$ shift can become complicated. For further processing, percent efficiency can be calculated as aged efficiency divided by new efficiency, analogously to the calculation of percent current described above.

Figure 9:
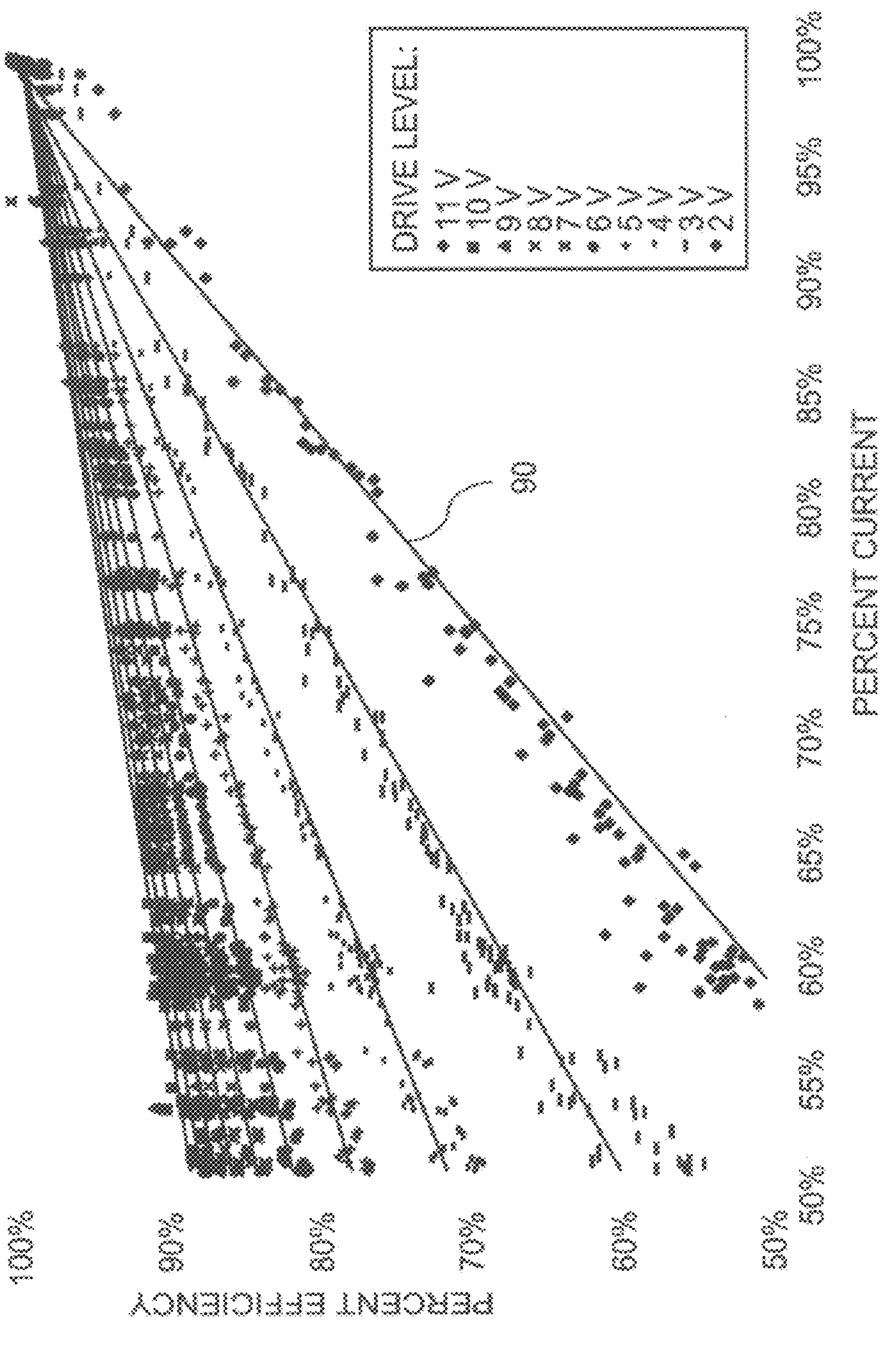
FIG. 9 is a representative plot showing percent efficiency as a function of percent current.

Referring to FIG. 9, there is shown an experimental plot of percent efficiency as a function of percent current at various drive levels, with linear fits e.g. 90 to the experimental data. As the plot shows, at any given drive level, efficiency is linearly related to percent current. This linear model permits effective open-loop efficiency compensation.

To compensate for $V_{th}$ and $V_{oled}$ shift and OLED efficiency loss due to operation of the drive transistor and EL emitter over time, the second above embodiment of the status signal generation unit 240 can be used. Subpixel currents can be measured at the measurement reference gate voltage 510. Un-aged current at point 511 is target signal $i_0$ 611. The most recent aged-subpixel current measurement 512*a* is most recent current measurement $i_1$ 612. Percent current 613 is the status signal. Percent current 613 can be 0 (dead pixel), 1 (no change), less than 1 (current loss) or greater than 1 (current gain). Generally it will be between 0 and 1, because the most recent current measurement will be lower than the target signal, which can preferably be a current measurement taken at panel manufacturing time.

The second above embodiment of the status signal generation unit 240 can also be used to compensate for mura: differences in the characteristics of a plurality of OLED subpixels on a panel before aging. Referring back to FIG. 5A, at any time, for example when a panel is manufactured, this method can be employed to measure values for point 512*a* of each of a plurality of EL subpixels, as described above. A target signal analogous to point 511 can then be calculated as the maximum of all points 512*a*, their mean, or another mathematical function as will be obvious to those skilled in the art. The same target signal can be employed for all EL subpixels. Percent current can be calculated for each EL subpixel using the new points 511 and 512*a*. In one embodiment, percent current 613 can be stored in memory 619 directly, rather than calculated from stored $i_0$ 611 and $i_1$ 612 values.

The third above embodiment of the status signal generation unit 240 can also be used in an embodiment for mura compensation. The current of each EL subpixel can be measured at a first and a second measurement reference gate voltage, or in general at a plurality of measurement reference gate voltages, to produce an I-V curve for each subpixel. A reference I-V curve can be calculated as the mean of all I-V curves, their minimum, or another mathematical function as will be obvious to those skilled in the art. A mura-compensation gain term $m_g$ 615 (FIG. 6B), and a mura-compensation offset term $m_o$ 616 can then be computed for each subpixel's respective I-V curve with respect to the reference by fitting techniques known in the statistical art.

The reference I-V curve can be calculated as the mean of the I-V curves of all subpixel on the panel, or of the subpixels in a particular region of the panel. Multiple reference I-V curves can be provided for different regions of the panel or for different color channels.

Figure 5C:
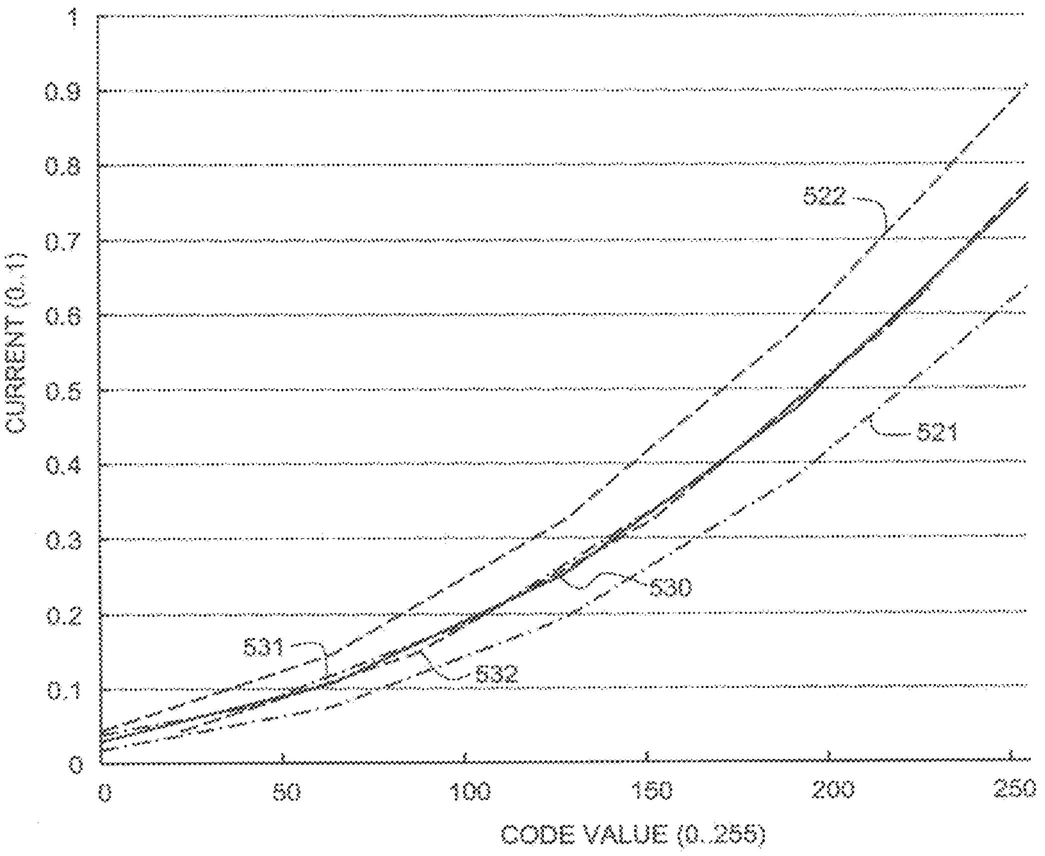
FIG. 5C is an example I-V curve measurement of multiple subpixels.

FIG. 5C shows an example of measured I-V curve data. The abscissa is code value (0 . . . 255), which corresponds to voltage e.g. through a linear map. The ordinate is normalized current on a 0 . . . 1 scale. I-V curves 521 (dash-dot) and 522 (dashed) correspond to two different subpixels on an EL panel, selected to represent extremes of variation on the EL panel. Reference I-V curve 530 (solid) is a reference curve calculated as the mean of the I-V curves of all subpixels on the panel. Compensated I-V curves 531 (dash-dot) and 532 (dashed) are the compensated results for I-V curves 521 and 522, respectively. Both I-V curves closely match the reference after compensation.

Figure 5D:
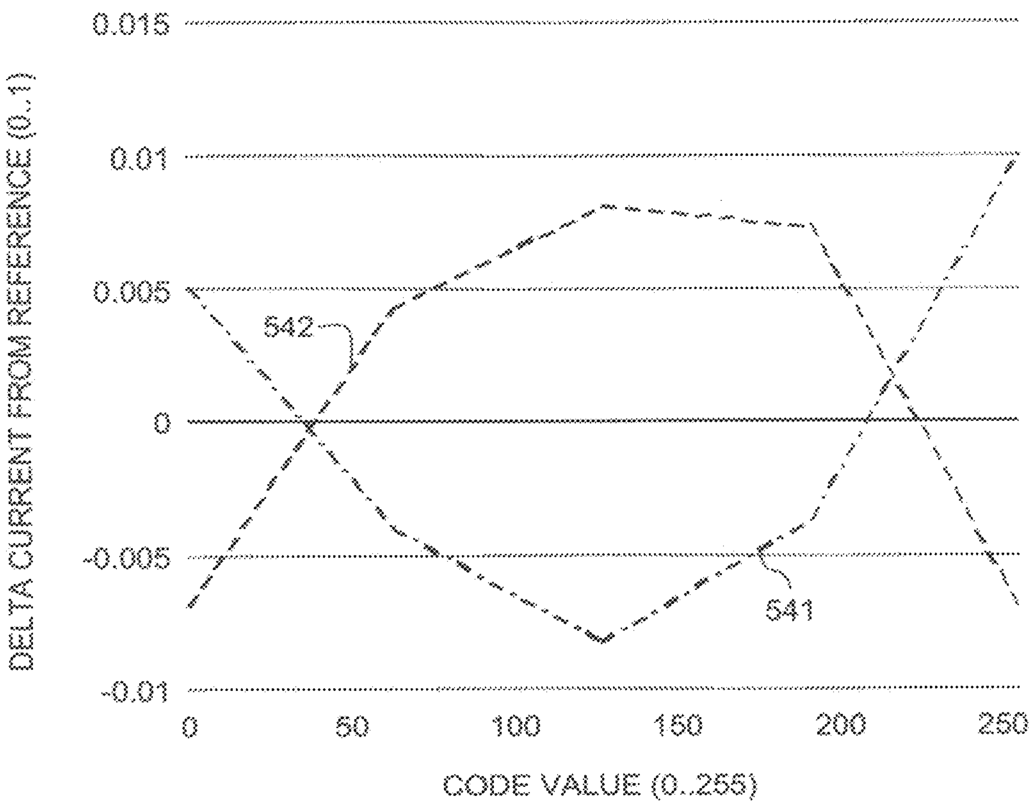
FIG. 5D is a plot of the effectiveness of mura compensation.

FIG. 5D shows the effectiveness of compensation. The abscissa is code value (0 . . . 255). The ordinate is current delta (0 . . . 1) between the reference and the compensated I-V curves. Error curves 541 (dash-dot) and 542 (dashed) correspond to I-V curves 521 and 522 after compensation using a gain and offset. The total error is within approximately +/−1% across the full code value range, indicating a successful compensation. In this example, error curve 541 was calculated with $m_g$=1.2, $m_o$=0.013, and error curve 542 with $m_g$=0.0835, $m_o$=−0.014.

Implementation

Figure 6A:
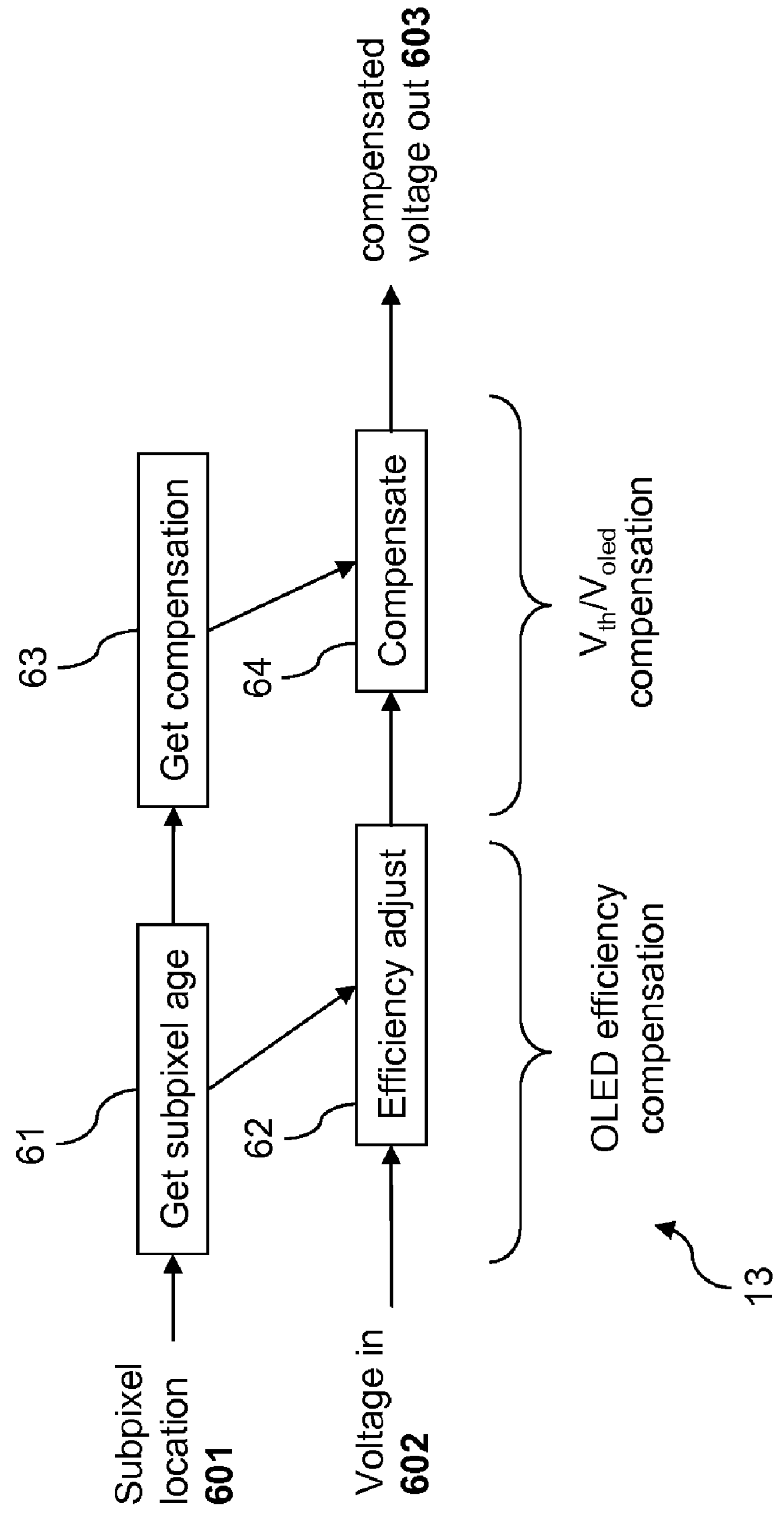
FIG. 6A is a high-level dataflow diagram of the compensator of FIG. 1.
Figure 6B:
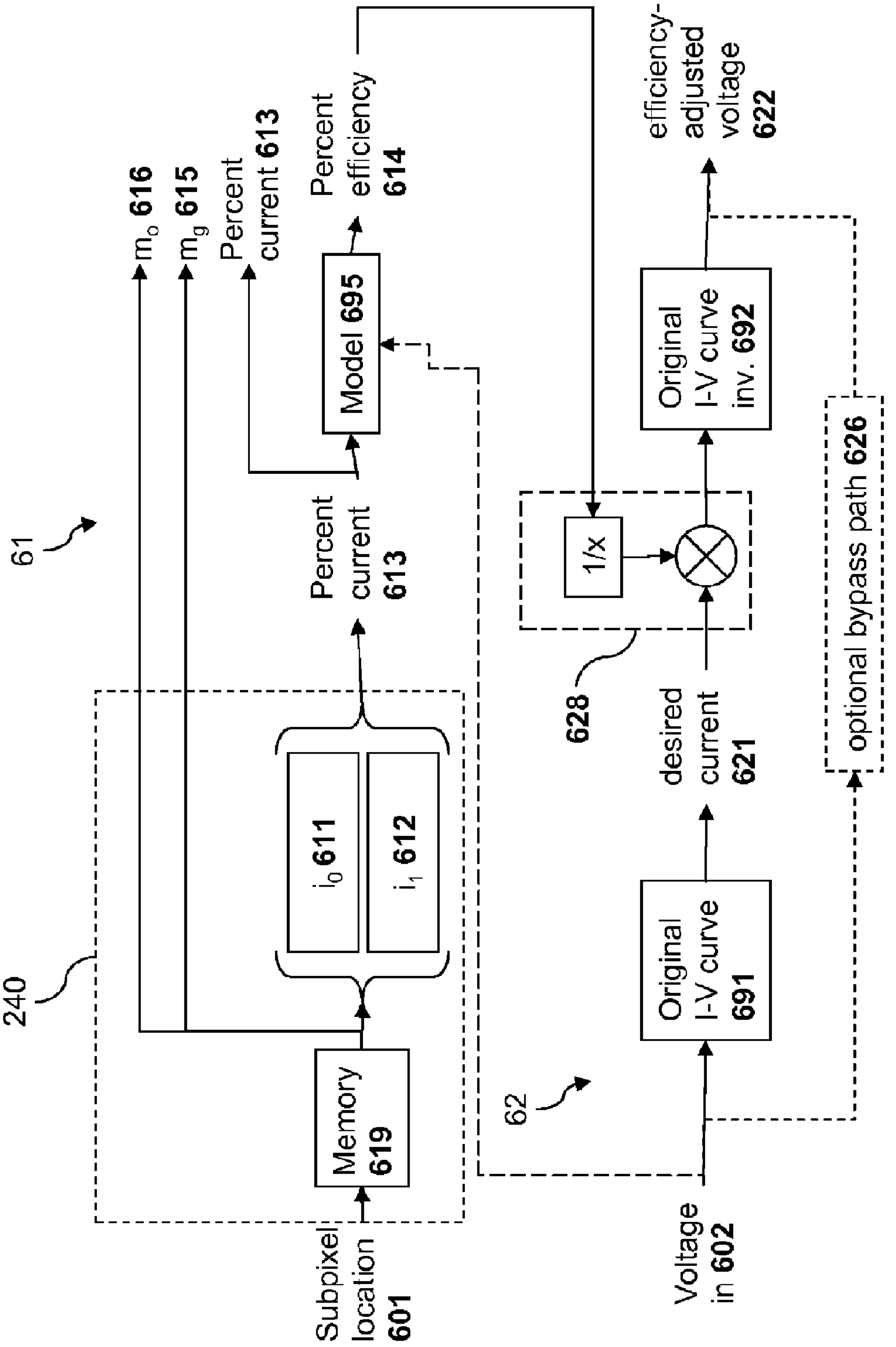
FIG. 6B is part one (of two) of a detailed dataflow diagram of the compensator.

Referring to FIG. 6A, there is shown an embodiment of a compensator 13. The compensator operates on one subpixel at a time; multiple subpixels can be processed serially. For example, compensation can be performed for each subpixel as its linear code value arrives from a signal source in the conventional left-to-right, top-to-bottom scanning order. Compensation can be performed on multiple pixels simultaneously by paralleling multiple copies of the compensation circuitry or by pipelining the compensator; these techniques will be obvious to those skilled in the art.

The inputs to compensator 13 are the location 601 of an EL subpixel and a linear code value 602 of that subpixel. The linear code value 602 can represent a commanded drive voltage. The compensator 13 changes the linear code value 602 to produce a changed linear code value for a source driver, which can be e.g. a compensated voltage out 603. The compensator 13 can include four major blocks: determining a subpixel's age 61, optionally compensating for OLED efficiency 62, determining the compensation based on age 63, and compensating 64. Blocks 61 and 62 are primarily related to OLED efficiency compensation, and blocks 63 and 64 are primarily related to voltage compensation, specifically $V_{th}$/$V_{oled}$ compensation.

FIG. 6B is an expanded view of blocks 61 and 62. As described above, the subpixel's location 601 is used to retrieve a stored target signal $i_0$ 611 and a stored most recent current measurement $i_1$ 612, and percent current 613, the status signal, is calculated.

Percent current 613 is sent to the next processing stage 63, and is also input to a model 695 to determine the percent OLED efficiency 614. Model 695 outputs an efficiency 614 which is the amount of light emitted for a given current at the time of the most recent measurement, divided by the amount of light emitted for that current at manufacturing time. Any percent current greater than 1 can yield an efficiency of 1, or no loss, since efficiency loss can be difficult to calculate for pixels which have gained current. Model 695 can also be a function of the linear code value 602, as indicated by the dashed arrow, in cases where OLED efficiency depends on commanded current. Whether to include linear code value 602 as an input to model 695 can be determined by life testing and modeling of a panel design.

Figure 12:
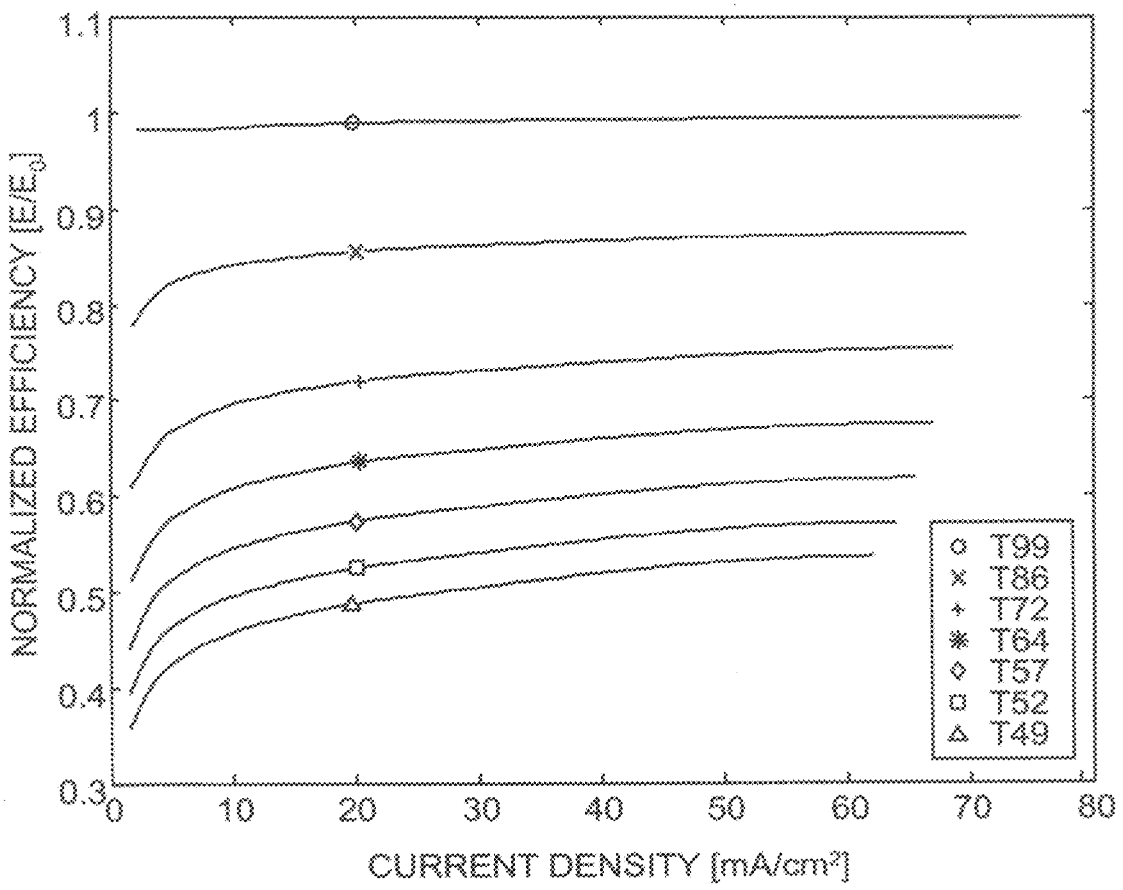
FIG. 12 is a graph showing the relationship between OLED efficiency, OLED age, and OLED drive current density.

Referring to FIG. 12, inventors have found that efficiency is generally a function of current density as well as of age. Each curve in FIG. 12 shows the relationship between current density, $I_{ds}$ divided by emitter area, and efficiency ($L_{oled}/I_{ds}$) for an OLED aged to a particular point. The ages are indicated in the legend using the T notation known in the art: e.g. T86 indicates 86% efficiency at a test current density of e.g. 20 mA/cm$^2$.

Referring back to FIG. 6B, model 695 can therefore include an exponential term (or some other implementation) to compensate for current density and age. Current density is linearly related to linear code value 602, which represents a commanded voltage. Therefore, the compensator 13, of which model 695 is part, can change the linear code value in response to both the status signal (percent current 613) and the linear code value 602 to compensate for the variations in the characteristics of the drive transistor and EL emitter in each EL subpixel, and specifically for variations in the efficiency of the EL emitter in each EL subpixel.

In parallel, the compensator receives a linear code value 602, e.g. a commanded voltage in. This linear code value 602 is passed through the original I-V curve 691 of the panel measured at manufacturing time to determine the desired current 621. This is divided by the percent efficiency 614 in operation 628 to return the light output for the desired current to its manufacturing-time value. The resulting, boosted current is then passed through curve 692, the inverse of curve 691, to determine what commanded voltage will produce the amount of light desired in the presence of efficiency loss. The value out of curve 692 is passed to the next stage as efficiency-adjusted voltage 622.

If efficiency compensation is not desired, linear code value 602 is sent unchanged to the next stage as efficiency-adjusted voltage 622, as indicated by optional bypass path 626. The percent current 613 is still calculated even if efficiency compensation is not desired, but the percent efficiency 614 need not be.

Figure 6C:
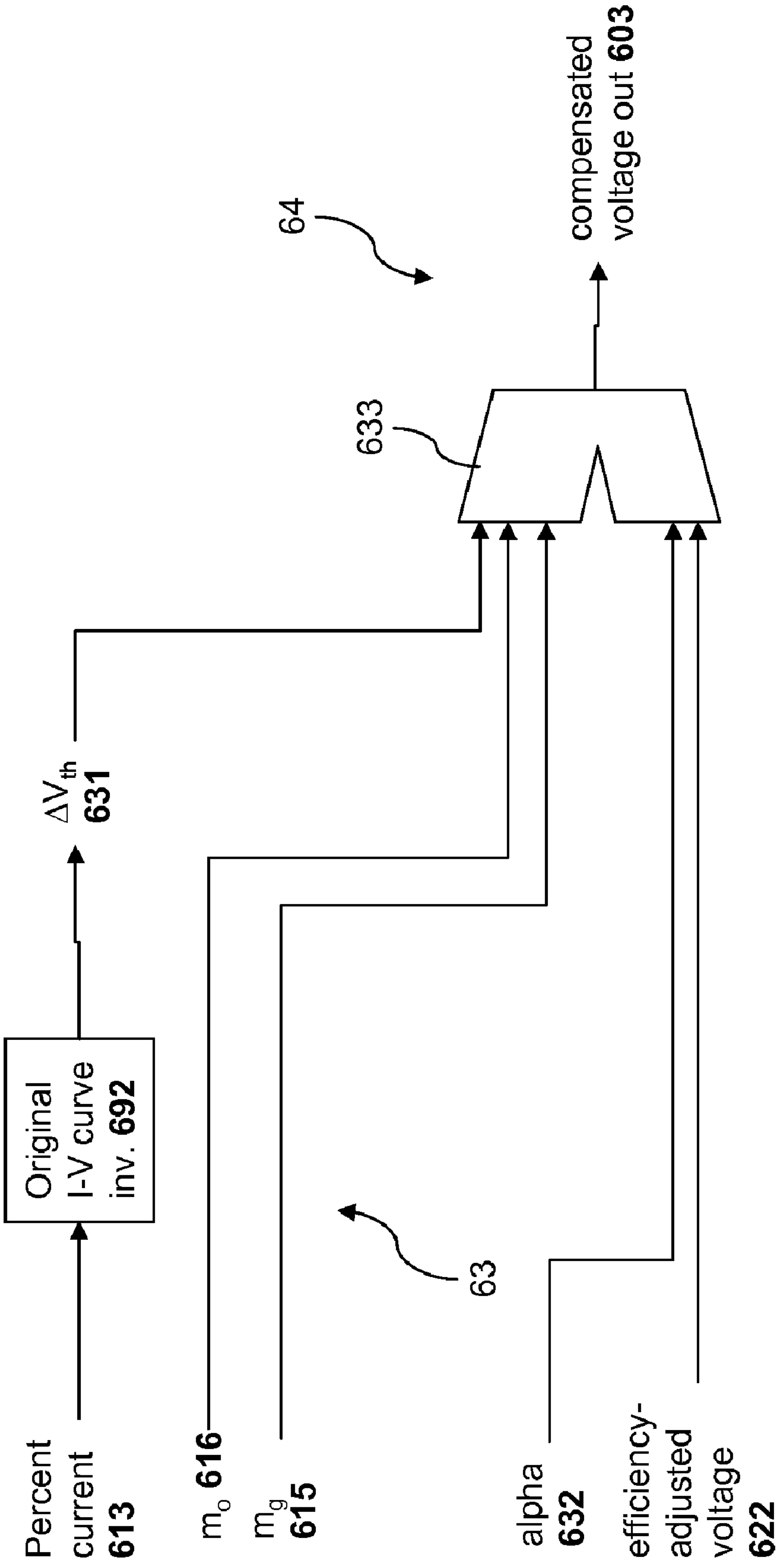
FIG. 6C is part two (of two) of a detailed dataflow diagram of the compensator.

FIG. 6C is an expanded view of FIG. 6A, blocks 63 and 64. It receives the percent current 613 and the efficiency-adjusted voltage 622 from the previous stages. Block 63, "Get compensation," includes mapping the percent current 613 through the inverse I-V curve 692 and subtracting the result (FIG. 5A 513) from the measurement reference gate voltage (510) to find the $V_{th}$ shift $\Delta V_{th}$ 631. Block 64, "Compensate," includes operation 633, which calculates the compensated voltage out 603 as given in Eq. 1:

$$V_{out}=(m_g*V_{in}+m_o)+\Delta V_{th}(1+\alpha(V_{g,ref}-V_{in})) \quad \text{(Eq. 1)}$$

where $V_{out}$ is compensated voltage out 603, $\Delta V_{th}$ is voltage shift 631, $\alpha$ is alpha value 632, $V_{g,ref}$ is the measurement reference gate voltage 510, $V_{in}$ is the efficiency-adjusted voltage 622, $m_g$ is the mura-compensation gain term 615, and mois the mura-compensation offset term 616. Eq. 1 performs both mura compensation and aging compensation: it compensates for variations in the characteristics of the drive transistor and EL emitter in each subpixel between subpixels or over time respectively. However, these two compensations can be performed individually. For aging compensation only, the multiplication by $m_g$ and addition of $m_o$ can be omitted; for mura compensation by the third above embodiment of the status signal generation unit 240 only, the addition of the $\Delta V_{th}$ term can be omitted. The compensated voltage out can be expressed as a changed linear code value for a source driver 14, and compensates for variations in the characteristics of the drive transistor and EL emitter.

For straight $V_{th}$ shift, $\alpha$ will be zero, and operation 633 will reduce to adding the $V_{th}$ shift amount to the efficiency-adjusted voltage 622. For any particular subpixel, the amount to add is constant until new measurements are taken. Therefore, the voltage to add in operation 633 can be pre-computed after measurements are taken, permitting blocks 63 and 64 to collapse to looking up the stored value and adding it. This can save considerable logic.

Cross-Domain Processing, and Bit Depth

Image-processing paths known in the art typically produce nonlinear code values (NLCVs), that is, digital values having a nonlinear relationship to luminance (Giorgianni & Madden. *Digital Color Management: encoding solutions*. Reading, Mass.: Addison-Wesley, 1998. Ch. 13, pp. 283-295). Using nonlinear outputs matches the input domain of a typical source driver, and matches the code value precision range to the human eye's precision range. However, $V_{th}$ shift is a voltage-domain operation, and thus is preferably implemented in a linear-voltage space. A source driver 14 can be used, and domain conversion performed before the source driver 14, to effectively integrate a nonlinear-domain image-processing path with a linear-domain compensator. Note that this discussion is in terms of digital processing, but analogous processing can be performed in an analog or mixed digital/analog system. Note also that the compensator can operate in linear spaces other than voltage. For example, the compensator can operate in a linear current space.

Figure 7:
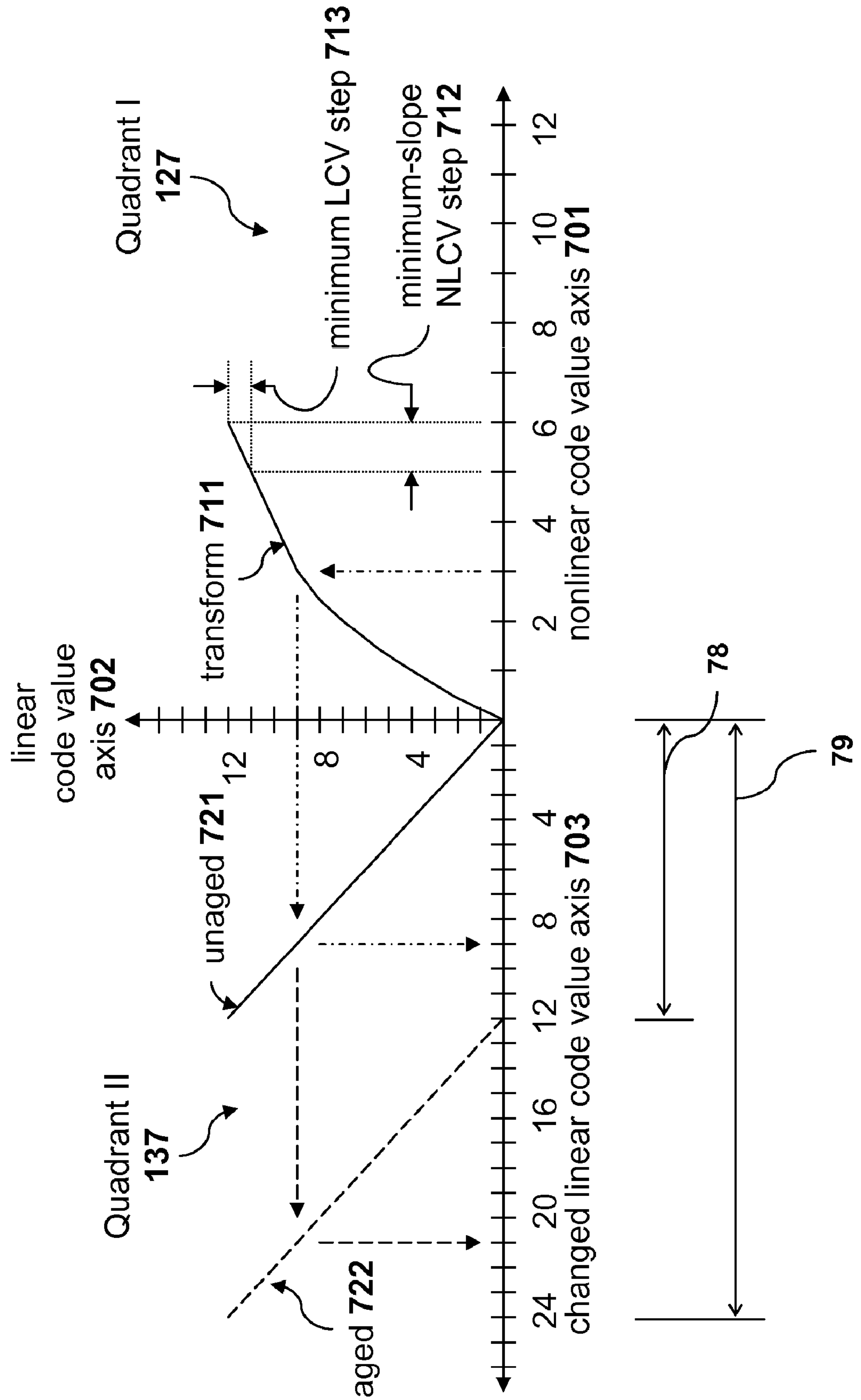
FIG. 7 is a Jones-diagram representation of the effect of a domain-conversion unit and a compensator.

Referring to FIG. 7, there is shown a Jones-diagram representation of the effect of domain-conversion unit 12 in Quadrant I 127 and a compensator 13 in Quadrant II 137. This figure shows the mathematical effect of these units, not how they are implemented. The implementation of these units can be analog or digital, and can include a lookup table or function. Quadrant I represents the operation of the domain-conversion unit 12: nonlinear input signals, which can be nonlinear code values (NLCVs), on an axis 701 are converted by mapping them through a transform 711 to form linear code values (LCVs) on an axis 702. Quadrant II represents the operation of compensator 13: LCVs on axis 702 are mapped through transforms such as 721 and 722 to form changed linear code values (CLCVs) on an axis 703.

Referring to Quadrant I, domain-conversion unit 12 receives respective NLCVs for each subpixel, and converts them to LCVs. This conversion should be performed with sufficient resolution to avoid objectionable visible artifacts such as contouring and crushed blacks. In digital systems, NLCV axis 701 can be quantized, as indicated in FIG. 7. LCV axis 702 can preferably have sufficient resolution to represent the smallest change in transform 711 between two adjacent NLCVs. This is shown as NLCV step 712 and corresponding LCV step 713. As the LCVs are by definition linear, the resolution of the whole LCV axis 702 should be sufficient to represent step 713. Consequently, the LCVs can be defined with finer resolution than the NLCVs in order to avoid loss of image information. The resolution can be twice that of step 713 by analogy with the Nyquist sampling theorem.

Transform 711 is an ideal transform for an unaged subpixel. It has no relationship to aging of any subpixel or the panel as a whole. Specifically, transform 711 is not modified due to any $V_{th}$, $V_{oled}$, or OLED efficiency changes. There can be one transform for all colors, or one transform for each color. The domain-conversion unit, through transform 711, advantageously decouples the image-processing path from the compensator, permitting the two to operate together without having to share information. This simplifies the implementation of both. Domain-conversion unit 12 can be implemented as a look-up table or a function analogous to an LCD source driver.

Referring to Quadrant II, compensator 13 changes LCVs to changed linear code values (CLCVs) on a per-subpixel basis. FIG. 7 shows the simple case, correction for straight $V_{th}$ shift, without loss of generality. Straight $V_{th}$ shift can be corrected for by straight voltage shift from LCVs to CLCVs. Other aging effects can be handled as described above in "Implementation."

Transform 721 represents the compensator's behavior for an unaged subpixel. The CLCV can thus be the same as the LCV. Transform 722 represents the compensator's behavior for an aged subpixel. The CLCV can be the LCV plus an offset representing the $V_{th}$ shift of the subpixel in question. Consequently, the CLCVs will generally require a larger range than the LCVs in order to provide headroom for compensation. For example, if a subpixel requires 256 LCVs when it is new, and the maximum shift over its lifetime is 128 LCVs, the CLCVs will need to be able to represent values up to 384=256+128 to avoid clipping the compensation of heavily-aged subpixels.

FIG. 7 shows a complete example of the effect of the domain-conversion unit and compensator. Following the dash-dot arrows in FIG. 7, an NLCV of 3 is transformed by the domain-conversion unit 12 through transform 711 to an LCV of 9, as indicated in Quadrant I. For an unaged subpixel, the compensator 13 will pass that through transform 721 as a CLCV of 9, as indicated in Quadrant II. For an aged subpixel with a $V_{th}$ shift analogous to 12 CLCVs, the LCV of 9 will be converted through transform 722 to a CLCV of 9+12=21.

In one embodiment, the NLCVs from the image-processing path are nine bits wide. The LCVs are 11 bits wide. The transformation from nonlinear input signals to linear code values can be performed by a LUT or function. The compensator can take in the 11-bit linear code value representing the desired voltage and produce a 12-bit changed linear code value to send to a source driver 14. The source driver 14 can then drive the gate electrode of the drive transistor of an attached EL subpixel in response to the changed linear code value. The compensator can have greater bit depth on its output than its input to provide headroom for compensation, that is, to extend the voltage range 78 to voltage range 79 and simultaneously keep the same resolution across the new, expanded range, as required for minimum linear code value step 713. The compensator output range can extend below the range of transform 721 as well as above it.

Each panel design can be characterized to determine what the maximum $V_{th}$ shift 73, $V_{oled}$ rise and efficiency loss will be over the design life of a panel, and the compensator 13 and source drivers 14 can have enough range to compensate. This characterization can proceed from required current to required gate bias and transistor dimensions via the standard transistor saturation-region $I_{ds}$ equation, then to $V_{th}$ shift over time via various models known in the art for a-Si degradation over time.

Sequence of Operations

Panel Design Characterization

This section is written in the context of mass-production of a particular OLED panel design. Before mass-production begins, the design can be characterized: accelerated life testing can be performed, and I-V curves are measured for various subpixels of various colors on various sample panels aged to various levels. The number and type of measurements required, and of aging levels, depend on the characteristics of the particular panel. With these measurements, a value alpha ($\alpha$) can be calculated and a measurement reference gate voltage can be selected. Alpha (FIG. 6C 632) is a value representing the deviation from a straight shift over time. An $\alpha$ value of 0 indicates all aging is a straight shift on the voltage axis, as would be the case e.g. for $V_{th}$ shift alone. The measurement reference gate voltage (FIG. 5A 510) is the voltage at which aging signal measurements are taken for compensation, and can be selected to both provide acceptable S/N ratio and keep power dissipation low.

The $\alpha$ value can be calculated by optimization. An example is given in Table 1. $\Delta V_{th}$ can be measured at a number of gate voltages, under a number of aging conditions. $\Delta V_{th}$ differences are then calculated between each $\Delta V_{th}$ and the $\Delta V_{th}$ at the measurement reference gate voltage 510. $V_g$ differences are calculated between each gate voltage and the measurement reference gate voltage 510. The inner term of Eq. 1, $\Delta V_{th} \cdot \alpha \cdot (V_{g,ref} - V_{in})$, can then be computed for each measurement to yield a predicted $\Delta V_{th}$ difference, using the appropriate $\Delta V_{th}$ at the measurement reference gate voltage 510 as $\Delta V_{th}$ in the equation, and using the appropriate calculated gate voltage difference as $(V_{g,ref} - V_i n)$. The $\alpha$ value can then be selected iteratively to reduce, and preferably mathematically minimize, the error between the predicted $\Delta V_{th}$ differences and the calculated $\Delta V_{th}$ differences. Error can be expressed as the maximum difference or the RMS difference. Alternative methods known in the art, such as least-squares fitting of $\Delta V_{th}$ difference as a function of $V_g$ difference, can also be used.

TABLE 1

Example of $\alpha$ calculation

| Vg | $\Delta V_{th}$ Day 1 | $\Delta V_{th}$ Day 8 | $V_g$ difference | $\Delta V_{th}$ difference Day 1 | $\Delta V_{th}$ difference Day 8 | Predicted $\Delta V_{th}$ difference Day 1 | Predicted $\Delta V_{th}$ difference Day 8 | Error Day 1 | Error Day 8 |
|---|---|---|---|---|---|---|---|---|---|
| ref = 13.35 | 0.96 | 2.07 | 0 | 0 | 0 | 0.00 | 0.00 | 0.00 | 0.00 |
| 12.54 | 1.05 | 2.17 | 0.81 | 0.09 | 0.1 | 0.04 | 0.08 | 0.05 | 0.02 |
| 11.72 | 1.1 | 2.23 | 1.63 | 0.14 | 0.16 | 0.08 | 0.17 | 0.06 | −0.01 |
| 10.06 | 1.2 | 2.32 | 3.29 | 0.24 | 0.25 | 0.16 | 0.33 | 0.08 | −0.08 |
| | | | $V_{g,ref} - V_{in}$ | | | $\alpha = 0.0491$ | | max = 0.08 | |

In addition to $\alpha$ and the measurement reference gate voltage, characterization can also determine, as described above, $V_{oled}$ shift as a function of $V_{th}$ shift, efficiency loss as a function of $V_{th}$ shift, self-heating component per subpixel, maximum $V_{th}$ shift, $V_{oled}$ shift and efficiency loss, and resolution required in the nonlinear-to-linear transform and in the compensator. Resolution required can be characterized in conjunction with a panel calibration procedure such as co-pending commonly-assigned U.S. Patent Application Publication No. 2008/0252653, the disclosure of which is incorporated herein. Characterization also determines, as will be described in "In the field," below, the conditions for taking characterization measurements in the field, and which embodiment of the status signal generation unit 240 to employ for a particular panel design. All these determinations can be made by those skilled in the art.

Mass-Production

Once the design has been characterized, mass-production can begin. At manufacturing time, appropriate values are measured for each panel produced according to a selected embodiment of the status signal generation unit 240. For example, I-V curves and subpixel currents can be measured. I-V curves can be averages of curves for multiple subpixels. There can be separate curves for different colors, or for different regions of the panel. Current can be measured at enough drive voltages to make a realistic I-V curve; any errors in the I-V curve can affect the results. Subpixel currents can be measured at the measurement reference gate voltage to provide target signals $i_0$ 611. For mura compensation, two measurements are taken, and $m_g$ and $m_o$ values calculated, for each subpixel. The I-V curves, reference currents and mura-compensation values are stored in a nonvolatile memory associated with the panel and it is sent into the field.

In the Field

Once in the field, the subpixels on the panel age at different rates depending on how hard they are driven. After some time one or more pixels have shifted far enough that they need to be compensated; how to determine that time is considered below.

To compensate, compensation measurements are taken and applied. The compensation measurements are of the current of each subpixel at the measurement reference gate voltage. The measurements are applied as described in "Algorithm," above. The measurements are stored so they can be applied whenever that subpixel is driven, until the next time measurements are taken. The sequence controller 37 can select the entire panel or any subset thereof when taking compensation measurements; when driving any subpixel, the most recent measurements for that subpixel can be used in the compensation. Status signals from the subpixels most recently measured can also be interpolated to estimate updated status signals for subpixels not measured in the most recent measurement pass. A first subset of the subpixels can thus be measured at one time and second subset at another time, permitting compensation across the panel even if not every subpixel has been measured in the most recent pass. Blocks larger than one subpixel can also be measured, and the same compensation applied to every subpixel in the block, but doing so requires care to avoid introducing block-boundary artifacts. Additionally, measuring blocks larger than one subpixel introduces vulnerability to visible burn-in of high spatial-frequency patterns; such patterns can have features smaller than the block size. This vulnerability can be traded off against the decreased time required to measure multiple-subpixel blocks compared to individual subpixels.

Figure 8:
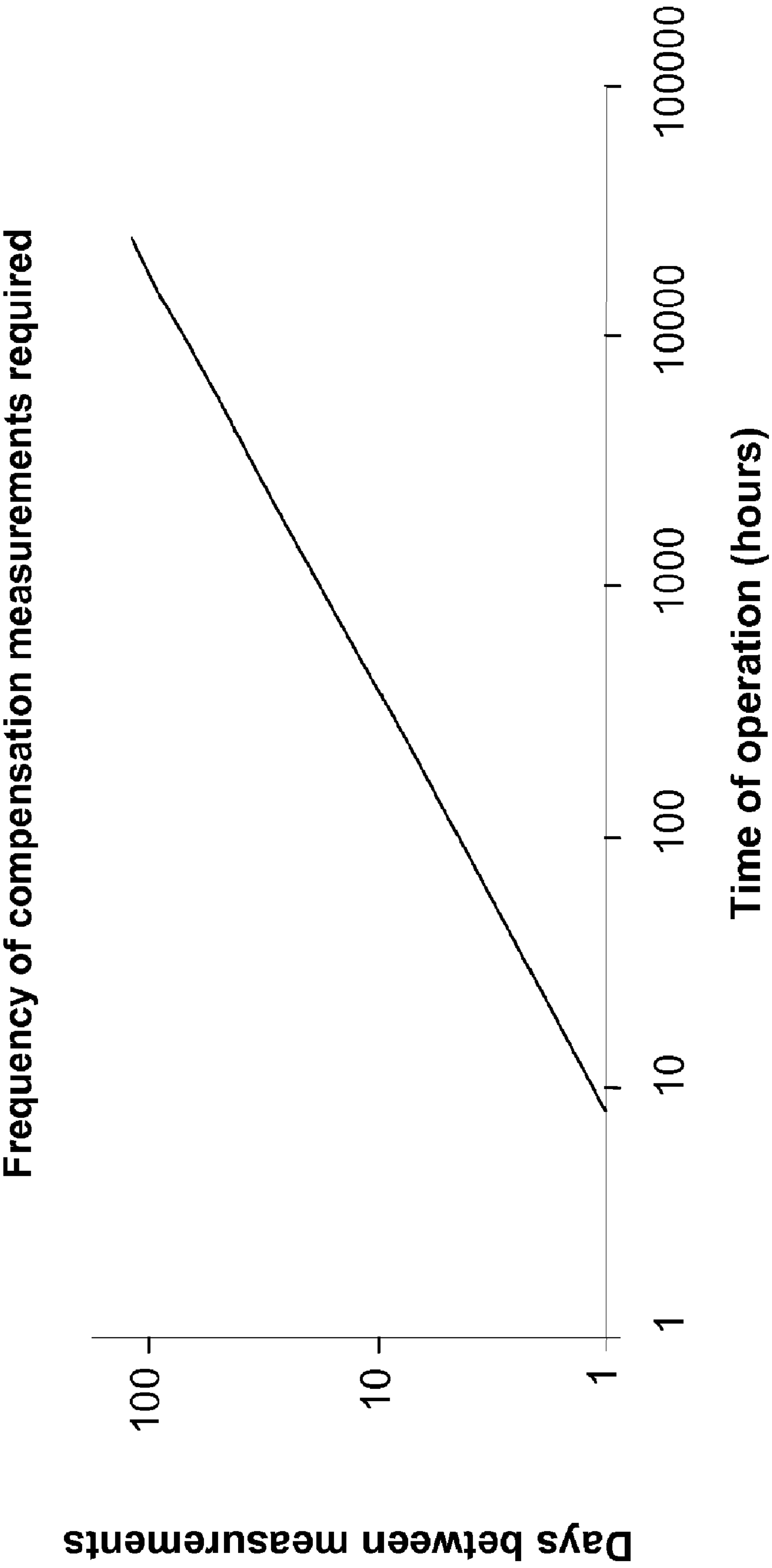
FIG. 8 is a representative plot showing frequency of compensation measurements over time.

Compensation measurements can be taken as frequently or infrequently as desired; a typical range can be once every eight hours to once every four weeks. FIG. 8 shows one example of how often compensation measurements might have to be taken as a function of how long the panel is active. This curve is only an example; in practice, this curve can be determined for any particular panel design through accelerated life testing of that design. The measurement frequency can be selected based on the rate of change in the characteristics of the drive transistor and EL emitter over time; both shift faster when the panel is new, so compensation measurements can be taken more frequently when the panel is new than when it is old. There are a number of ways to determine when to take compensation measurements. For example, the total current drawn by the entire panel active at some given drive voltage can be measured and compared to a previous result of the same measurement. In another example, environmental factors which affect the panel, such as temperature and ambient light, can be measured, and compensation measurements taken e.g. if the ambient temperature has changed more than some threshold. Alternatively, the current of individual subpixels can be measured, either in the image area of the panel or out. If outside the image area of the panel, the subpixels can be reference subpixels provided for measurement purposes. The subpixels can be exposed to whatever portion of the ambient conditions is desired. For example, subpixels can be covered with opaque material to cause them to respond to ambient temperature but not ambient light.

The invention has been described in detail with particular reference to certain preferred embodiments thereof, but it will be understood that variations and modifications can be effected within the spirit and scope of the invention.

For example, the EL subpixel 15 shown in FIG. 2 is for an N-channel drive transistor and a non-inverted EL structure. The EL emitter 202 is tied to the second supply electrode 205, which is the source of the drive transistor 201, higher voltages on the gate electrode 203 command more light output, and voltage supply 211 is more positive than second voltage supply 206, so current flows from 211 to 206. However, this invention is applicable to any combination of P- or N-channel drive transistors and non-inverted (common-cathode) or inverted (common-anode) EL emitters. The appropriate modifications to the circuits for these cases are well-known in the art.

In a preferred embodiment, the invention is employed in a display panel that includes Organic Light Emitting Diodes (OLEDs) which are composed of small molecule or polymeric OLEDs as disclosed in but not limited to U.S. Pat. No. 4,769,292, by Tang et al., and U.S. Pat. No. 5,061,569, by VanSlyke et al. Many combinations and variations of organic light emitting materials can be used to fabricate such a panel. Referring to FIG. 2, when EL emitter 202 is an OLED emitter, EL subpixel 15 is an OLED subpixel. This invention also applies to EL emitters other than OLEDs. Although the degradation modes of other EL emitter types can be different than the degradation modes described herein, the measurement, modeling, and compensation techniques of the present invention can still be applied.

The above embodiments can apply to any active matrix backplane that is not stable as a function of time (such as a-Si), or that exhibits initial nonuniformity. For instance, transistors formed from organic semiconductor materials and zinc oxide are known to vary as a function of time and therefore this same approach can be applied to these transistors. Furthermore, as the present invention can compensate for EL emitter aging independently of transistor aging, this invention can also be applied to an active-matrix backplane with transistors that do not age, such as low-temperature poly-silicon (LTPS) TFTs. On an LTPS backplane, the drive transistor 201 and select transistor 36 are low-temperature polysilicon transistors.

PARTS LIST

| | |
|---|---|
| 10 | overall system |
| 11 | nonlinear input signal |
| 12 | converter to voltage domain |
| 13 | compensator |
| 14 | source driver |
| 15 | EL subpixel |
| 16 | current-measurement circuit |
| 30 | EL panel |
| 32 | column line |
| 32a | column line |
| 32b | column line |
| 32 | ccolumn line |
| 33 | gate driver |
| 34 | arow line |
| 34 | brow line |
| 34 | crow line |
| 35 | subpixel matrix |
| 36 | select transistor |
| 37 | sequence controller |
| 41 | current |
| 42 | current |
| 43 | difference |
| 49 | dark current |
| 61 | block |
| 62 | block |
| 63 | block |
| 64 | block |
| 78 | voltage range (NOTE: on page 36) |
| 79 | voltage range (NOTE: on page 36) |
| 90 | linear fit |
| 127 | quadrant |
| 137 | quadrant |
| 200 | switch |
| 201 | drive transistor |
| 202 | EL emitter |
| 203 | gate electrode |
| 204 | first supply electrode |
| 205 | second supply electrode |
| 206 | voltage supply |
| 207 | first electrode |
| 208 | second electrode |
| 210 | current mirror unit |
| 211 | voltage supply |
| 212 | first current mirror |
| 213 | first current mirror output |
| 214 | second current mirror |
| 215 | bias supply |
| 216 | current-to-voltage converter |
| 220 | correlated double-sampling unit |
| 221 | sample-and-hold unit |
| 222 | sample-and-hold unit |
| 223 | differential amplifier |
| 230 | analog-to-digital converter |
| 240 | status signal generation unit |
| 421 | self-heating amount |
| 422 | self-heating amount |
| 423 | measurement |
| 424 | current |
| 501 | unaged I-V curve |
| 502 | aged I-V curve |

-continued

| PARTS LIST | |
|---|---|
| 503 | voltage difference |
| 504 | voltage difference |
| 505 | voltage difference |
| 506 | voltage difference |
| 510 | measurement reference gate voltage |
| 511 | current |
| 512a | current |
| 512b | current |
| 513 | voltage |
| 514 | voltage shift |
| 521 | I-V curve |
| 522 | I-V curve |
| 530 | reference I-V curve |
| 531 | compensated I-V curve |
| 532 | compensated I-V curve |
| 541 | error curve |
| 542 | error curve |
| 550 | voltage shift |
| 552 | voltage shift |
| 601 | location |
| 602 | linear code value |
| 603 | compensated voltage |
| 611 | target signal |
| 612 | measurement |
| 613 | percent current |
| 614 | percent efficiency |
| 615 | mura-correction gain term |
| 616 | mura-correction offset term |
| 619 | memory |
| 621 | current |
| 622 | voltage |
| 626 | bypass path |
| 628 | operation |
| 631 | voltage shift |
| 632 | alpha value |
| 633 | operation |
| 691 | I-V curve |
| 692 | inverse of I-V curve |
| 695 | model |
| 701 | axis |
| 702 | axis |
| 703 | axis |
| 711 | smallest change in transform |
| 712 | step |
| 713 | step |
| 721 | transform |
| 722 | transform |
| 1002 | storage capacitor |
| 1011 | bus line |
| 1012 | sheet cathode |

The invention claimed is:

1. Apparatus for providing drive transistor control signals to the gate electrodes of drive transistors in a plurality of EL subpixels in an EL panel, comprising a first voltage supply, a second voltage supply, and a plurality of EL subpixels in the EL panel, each EL subpixel comprising a drive transistor for applying current to an EL emitter in each EL subpixel, each drive transistor comprising a first supply electrode electrically connected to the first voltage supply and a second supply electrode electrically connected to a first electrode of the EL emitter; and each EL emitter comprising a second electrode electrically connected to the second voltage supply, the improvement comprising:

a sequence controller for selecting one or more of the plurality of EL subpixels;

a test voltage source electrically connected to the gate electrodes of the drive transistors of the one or more selected EL subpixels;

a voltage controller for controlling voltages of the first voltage supply, second voltage supply, and test voltage source to operate the drive transistors of the one or more selected EL subpixels in a linear region;

a measuring circuit for measuring the current passing through the first and second voltage supplies to provide respective status signals for each of the one or more selected EL subpixels representing the characteristics of the drive transistor and EL emitter of those subpixels, the current being measured while the drive transistors of the one or more selected EL subpixels are operated in the linear region;

means for providing a linear code value for each subpixel;

a compensator for changing the linear code values in response to the status signals to compensate for variations in the characteristics of the drive transistor and EL emitter in each subpixel; and a source driver for producing the drive transistor control signals in response to the changed linear code values for driving the gate electrodes of the drive transistors.

2. The apparatus of claim 1, further comprising:

means for providing a respective target signal for each EL subpixel, wherein the measuring circuit uses the target signals while providing the respective status signals for each of the one or more selected EL subpixels.

3. The apparatus of claim 1, wherein the measuring circuit further comprises a memory for storing the respective target signal of each EL subpixel.

4. The apparatus of claim 3, wherein the memory further stores a respective most recent current measurement of each EL subpixel.

5. The apparatus of claim 1, wherein:

each EL emitter comprises an OLED emitter; and each drive transistor comprises a low temperature polysilicon transistor.

6. The apparatus of claim 1, wherein the measuring circuit comprises:

a current to voltage converter for producing a voltage signal; and a correlated double-sampling unit responsive to the voltage signal used in providing the status signal to the compensator.

7. The apparatus of claim 1, further comprising:

a plurality of second voltage supplies, wherein the second electrode of each EL emitter comprises a electrically connected to only one second voltage supply.

8. The apparatus of claim 1, wherein:

the plurality of EL subpixels in the EL panel are arranged in rows and columns; and the sequence controller selects all EL subpixels in a selected row.

9. The apparatus of claim 1, wherein the sequence controller selects different groups of EL subpixels at different times.

10. The apparatus of claim 1, wherein:

the measuring circuit measures the current passing through the first and second voltage supplies at different times; and each status signal represents variations in the characteristics of the respective drive transistor and EL emitter caused by operation of the respective drive transistor and EL emitter over time.

11. The apparatus of claim 1, wherein the compensator further changes the linear code values in response to the linear code values to compensate for the variations in the characteristics of the drive transistor and EL emitter in each subpixel.

12. The apparatus of claim 1, further including a switch for selectively electrically connecting the measuring circuit to the current flow through the first and second supply electrodes.

13. The apparatus of claim 1, wherein the measuring circuit comprises:

a first current mirror for producing a mirrored current which is a function of the drive current passing through the first and second supply electrodes; and a second current mirror for applying a bias current to the first current mirror to reduce impedance of the first current mirror.

14. The apparatus of claim 1, wherein the measured current is less than a selected threshold current.

* * * * *